(12) United States Patent
Li et al.

(10) Patent No.: US 7,700,517 B2
(45) Date of Patent: Apr. 20, 2010

(54) OCTAHEDRAL MOLECULAR SIEVE SORBENTS AND CATALYSTS

(75) Inventors: Liyu Li, Richland, WA (US); David L. King, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 755 days.

(21) Appl. No.: 11/347,459

(22) Filed: Feb. 3, 2006

(65) Prior Publication Data
US 2006/0177367 A1 Aug. 10, 2006

Related U.S. Application Data

(63) Continuation-in-part of application No. PCT/US2005/003600, filed on Feb. 4, 2005, which is a continuation of application No. 10/771,866, filed on Feb. 4, 2004, now Pat. No. 7,153,345.

(60) Provisional application No. 60/649,656, filed on Feb. 3, 2005.

(51) Int. Cl.
*B01J 23/34* (2006.01)
*B01J 23/50* (2006.01)
*B01J 20/06* (2006.01)

(52) U.S. Cl. .................. 502/324; 502/347; 502/400
(58) Field of Classification Search .................. 502/324, 502/347, 400
See application file for complete search history.

(56) References Cited

U.S. PATENT DOCUMENTS

| | | | |
|---|---|---|---|
| 5,340,562 A | 8/1994 | O'Young et al. |
| 5,545,393 A | 8/1996 | O'Young et al. |
| 5,578,282 A | 11/1996 | O'Young et al. |
| 5,597,944 A | 1/1997 | O'Young et al. |
| 5,635,155 A | 6/1997 | O'Young et al. |
| 5,695,618 A | 12/1997 | O'Young et al. |

(Continued)

FOREIGN PATENT DOCUMENTS

DE  10049119  4/2002

(Continued)

OTHER PUBLICATIONS

Xia, Guan-Guang; "Transformation from Layered to Tunnel Structures: Synthesis, Characterization, and Applications of Manganese Oxide Octahedral Molecular Sieves"; Doctoral Thesis, University of Connecticut, May 2002.*

(Continued)

*Primary Examiner*—Melvin C Mayes
*Assistant Examiner*—James Corno
(74) *Attorney, Agent, or Firm*—Klarquist Sparkman, LLP

(57) ABSTRACT

Octahedral molecular sieve sorbents and catalysts are disclosed, including silver hollandite and cryptomelane. These materials can be used, for example, to catalyze the oxidation of $CO_x$ (e.g., CO), $NO_x$ (e.g., NO), hydrocarbons (e.g., $C_3H_6$) and/or sulfur-containing compounds. The disclosed materials also may be used to catalyze other reactions, such as the reduction of $NO_2$. In some cases, the disclosed materials are capable of sorbing certain products from the reactions they catalyze. Silver hollandite, in particular, can be used to remove a substantial portion of certain sulfur-containing compounds from a gas or liquid by catalysis and/or sorption. The gas or liquid can be, for example, natural gas or a liquid hydrocarbon.

26 Claims, 26 Drawing Sheets

U.S. PATENT DOCUMENTS

| | | | |
|---|---|---|---|
| 5,702,674 | A | 12/1997 | O'Young et al. |
| 5,772,898 | A | 6/1998 | Lewis |
| 5,846,406 | A | 12/1998 | Sudhaker et al. |
| 5,898,015 | A | 4/1999 | Yokoi et al. |
| 6,001,319 | A | 12/1999 | Yokoi et al. |
| 6,145,303 | A | 11/2000 | Strehlau et al. |
| 6,156,283 | A | 12/2000 | Allen et al. |
| 6,162,530 | A | 12/2000 | Xiao et al. |
| 6,340,066 | B1 | 1/2002 | Dettling et al. |
| 6,471,923 | B1 | 10/2002 | Becue et al. |
| 6,503,476 | B1 | 1/2003 | Suib et al. |
| 6,517,802 | B1 | 2/2003 | Xiao et al. |
| 6,517,899 | B1 | 2/2003 | Hoke et al. |
| 6,551,564 | B1 * | 4/2003 | Becue et al. ............ 423/239.1 |
| 6,579,507 | B2 | 6/2003 | Pahlman et al. |
| 2003/0091499 | A1 | 5/2003 | Becue et al. |

FOREIGN PATENT DOCUMENTS

| | | |
|---|---|---|
| EP | 0710622 | 5/1996 |
| EP | 1099467 | 5/2001 |

OTHER PUBLICATIONS

Xia, G. G. et al.; "Efficient Stable Catalysts for Low Temperature Carbon Monoxide Oxidation;" Journal of Catalysis v.185 p. 91 (1999).*

"Automobiles and Carbon Monoxide;" U.S. Environmental Protection Agency Office of Mobile Sources; Fact Sheet OMS-3, EPA 400-F-92-005, Jan. 1993.*

Li, L. et al.; Chemistry of Materials v. 17 p. 4335-4343 (2005).*

Liyu, Li et al., "Cryptomelane as High Capacity Sulfur Dioxide Absorbent for Diesel Emission Control: A Stability Study," *Ind. Eng. Chem. Res.*, vol. 44, pp. 7388-7397 (2005).

Liyu, Li et al., "Synthesis and Characterization of Silver Hollandite and Its Application in Emission Control," *Chem. Mater.*, vol. 17, pp. 4335-4343 (2005).

International Search Report and Written Opinion for PCT Patent Application No. PCT/US2005/003600, filed Feb. 4, 2005.

* cited by examiner

XRD Pattern of Ag-Hollandite from Systhesis Method A

TEM Image of Ag-Hollandite from Synthesis Method A

TEM Image of Ag-Hollandite B

EDS of spot A

EDS of spot B

OCTAHEDRAL MOLECULAR SIEVE SORBENTS AND CATALYSTS

RELATED APPLICATION DATA

This application is a continuation-in-part of International Patent Application No. PCT/US/2005/003600, filed Feb. 4, 2005, which is a continuation of U.S. patent application Ser. No. 10/771,866, filed Feb. 4, 2004, now U.S. Pat. No. 7,153,345. This application also claims the benefit of the earlier filing date of U.S. Provisional Application No. 60/649,656, filed Feb. 3, 2005. International Patent Application No. PCT/US/2005/003600, U.S. patent application Ser. No. 10/771,866, and U.S. Provisional Application No. 60/649,656 are incorporated herein by reference.

GOVERNMENT RIGHTS

This invention was made with Government support under Contract Number DE-AC06-76RL01830 awarded by the U.S. Department of Energy. The Government has certain rights in the invention.

FIELD

This disclosure is generally related to pollution control and purification technologies, and more particularly, but not exclusively, is directed to octahedral molecular sieve sorbents and catalysts and uses therefore in emissions control and purification.

BACKGROUND

The combustion waste gases (i.e. the exhaust) of thermal power plants, factories, on-road vehicles, diesel generators, and the like typically contain $SO_x$ and $NO_x$. State and federal regulations limit the permissible amounts of these emissions because they create environment problems, such as acid rain. Accordingly, there is a continual need for improvements in the cost effective and efficient control of these emissions.

One mechanism for limiting $NO_x$ and $SO_x$ emissions is to remove or scrub the pollutants from the exhaust gas using a sorption bed, trap or similar device. Because many $NO_x$ traps have been found to be poisoned by the presence of $SO_x$, it is important to remove as much $SO_x$ from the exhaust gas as possible. However, as compared to the large volume of studies on $NO_x$ reduction, $SO_x$ removal using solid sorbents is an area in need of scientific advancement. Certain types of materials have been identified as possible solid sorbents for use in $SO_x$ sorption beds and traps, such as calcium oxide and alkalized alumina ($Na/Al_2O_3$ or $K/Al_2O_3$), copper-based sorbents (e.g., $Cu/Al_2O_3$), promoted metal oxides (e.g., $TiO_2$, $Al_2O_3$ and $ZrO_2$), promoted cerium oxide (La- or Cu-doped $CeO_2$), and supported cobalt ($Co/Al_2O_3$). Unfortunately, over the temperature range of about 250° C. to 475° C., these materials typically have a relatively low sorption capacity. For example, their total sorption capacity of $SO_2$ is typically less than about 10 wt % based on the weight of the sorbent, and their breakthrough sorption capacity can be substantially lower, depending on operating conditions. As it is combustion in this temperature range that leads to a significant portion of the total $SO_x$ emissions, a greater sorption capacity at these temperatures is needed.

One approach to increasing the sorption capacity of $SO_x$ sorption beds is to provide an oxidation catalyst upstream or admixed with the bed so as to convert most of the $SO_2$ to $SO_3$, since $SO_3$ is generally more readily sorbed than $SO_2$ due to its ability to form stable surface sulfates. However, the cost of recovery of the oxidation catalyst (frequently a precious metal) and the relatively poor conversion efficiency of $SO_2$ to $SO_3$ at temperatures below about 300° C. limits the effectiveness of this approach as well.

SUMMARY

Disclosed herein are systems and techniques for $SO_x$ emission control. Some disclosed embodiments concern materials for sorbing, trapping, or otherwise eliminating sulfur oxides from gases, such as sulfur oxides present in exhaust gases of internal combustion engines. These materials can include mixed oxides having a framework of metal cation or cations (M) each surrounded by 6 oxygen atoms. The octahedra ($MO_6$) thus formed can be connected together by edges and vertices, resulting in a structure with channels in at least one direction in space. The sides of the channels can be formed by the linked octahedra. The octahedra can be connected together by the edges, while the sides of the channels are connected together by the vertices of the octahedra.

The width of the channels can vary depending on whether the sides are composed of 2, 3 and/or 4 octahedra, which, in turn, depends on the mode of preparation. This type of material is known by its acronym OMS (octahedral molecular sieve). In some disclosed embodiments, the materials are selected so that they have a structure that generates channels either with a square cross section composed of, for example, one octahedra by one octahedra (OMS 1×1), two octahedra by two octahedra (OMS 2×2) or three octahedra by three octahedra (OMS 3×3), or with a rectangular cross section composed of, for example, two octahedra by three octahedra (OMS 2×3). Thus, certain of the materials will have a pyrolusite (OMS 1×1), hollandite (OMS 2×2), romanechite (OMS 2×3) or todorokite (OMS 3×3) type structure. Other OMS structures, such as 1×3, 1×4, 2×4, 3×4 and 4×4, are also contemplated, though the 2×2 structure has been found to be particularly effective in certain applications.

The disclosed OMS materials are preferably manganese based (Mn—OMS), which means that, if more than one metal cation (M) is present, a major portion of the metal cations (M) is manganese (Mn). A metal cation (M) is in the majority when it satisfies the following formula: $(n_{maj}/\Sigma n_M) > (1/N)$, where $(n_M)$ is the number of atoms of each metal cation (M) within the framework, (N) is the number of different metal cations (M) within the framework, and $(n_{maj})$ is the number of atoms of the metal cation (M) with the greatest number of atoms of any of the metal cations (M) within the framework. Most preferably, over about 50% of the metal cations (M) are manganese for example at least about 75% or at least about 90% of the metal cations (M) by mole. Preferably the manganese has an oxidation number between +2 and +4. The balance of metal cations (M) can include one or more elements from groups IIIB to IIIA in the periodic table such as $Zn^{2+}$, $Co^{2+}$, $Ni^{2+}$, $Fe^{2+}$, $Al^{3+}$, $Ga^{3+}$, $Fe^{3+}$, $Ti^{3+}$, $In^{3+}$, $Cr^{3+}$, $Si^{4+}$, $Ge^{4+}$, $Ti^{4+}$, $Sn^{4+}$, $Sb^{5+}$ and combinations thereof.

The disclosed materials can have a characteristic structure with a high surface area and may be capable of oxidizing $SO_2$ to $SO_3$ and/or converting $SO_3$ to a sulfate. In certain embodiments, another cation, such as $H^+$, $NH^{4+}$, $Li^+$, $Na^+$, $Ag^+$, $K^+$, $Rb^+$, $Tl^+$, $Cs^+$, $Mg^{2+}$, $Ca^{2+}$, $Sr^{2+}$, $Ba^{2+}$, $Ra^{2+}$, $Cu^{2+}$, $Pb^{2+}$, locates in the channels in the OMS structures.

In embodiments having a sorbing phase of materials with type OMS 2×2, OMS 2×3 and/or OMS 3×3, the materials may have a three-dimensional structure that generates chan nels in at least one direction in space, is composed of octahedra ($MO_6$), and comprises:

at least one metal cation (M) selected from the group formed by elements from groups IIIB, IVB, VB, VIB, VIIB, VIII, IB, IIB, IIIA of the periodic table and germanium, each metal cation (M) being coordinated with 6 oxygen atoms, and being located at the center of the resulting oxygen octahedra, wherein a major portion of metal cation or cations (M) is manganese; and at least one element (B) selected from the group formed by the alkali elements IA (such as $K^+$), the alkaline-earth elements IIA, the rare earths IIIB, transition metals (such as $Ag^+$) and elements from groups IIIA and IVA, element or elements (B) generally being located in channels in the oxide structure.

More particularly, metal cation or cations (M) can be selected from scandium, titanium, zirconium, vanadium, niobium, chromium, molybdenum, tungsten, manganese, iron, cobalt, nickel, copper, zinc, aluminum, gallium, and mixtures thereof.

The average charge (oxidation number) carried by the cation or cations (M) from groups IIIB to IIIA is preferably about +3.5 to +4. Preferably, at least about 50% of the metal cation or cations (M) in the material is manganese, titanium, chromium, aluminum, zinc, copper, zirconium, iron, cobalt, and/or nickel. More preferably, over 50% of the metal cation or cations (M) is manganese, chromium, copper, iron, titanium, and/or zirconium. In one form, manganese composes at least about 50% of the metal cation or cations (M) by mole, for example, at least 75% or 90% of the metal cation or cations (M).

Other metal cation or cations (M) from groups IIIB to IIIA, including the transition metals, can be added in minor quantities as dopants. Preferably, the element or elements from groups IIIB to IIIA added in minor quantities is/are selected from scandium, titanium, zirconium, vanadium, niobium, chromium, molybdenum, tungsten, manganese, iron, cobalt, nickel, copper, zinc, aluminum, gallium, and mixtures thereof.

Element or elements (B) may belong to the group formed by the alkali elements IA, alkaline-earth elements IIA, rare earth elements IIIB, transition metals (such as elements from group IB, e.g. silver) and elements from groups IIIA and IVA. They can be located in the channels of the material. Preferably, element or elements (B) is/are selected from potassium, silver, sodium, magnesium, barium, strontium, iron, copper, zinc, aluminum, rubidium, calcium and mixtures thereof.

In a preferred embodiment, the material is of the formula $X_aMn_8O_{16}$ wherein X is an alkali metal, an alkaline earth metal, or a transition metal, and a is between 0.5 and 2.0. In still further preferred forms the material is cryptomelane, silver hollandite, or a combination thereof.

A number of different methods exist for preparing these materials (see references 3 and 4 below, for example). They may be synthesized by mixing and grinding solid inorganic precursors of metal oxides (metals M and B), followed by calcining. The materials can also be obtained by heating solutions of precursor salts to reflux, drying and calcining, by precipitating precursor salts by the sol-gel method, or by hydrothermal synthesis, which consists of heating an aqueous solution containing the elements constituting the final material under autogenous pressure. The materials obtained from these syntheses can be modified by ion exchange or isomorphous substitution.

For example, it has been found that highly crystallized silver hollandite can be obtained by the ion exchange of cryptomelane in a silver salt melt. Preferably, this silver salt melt is substantially pure, i.e. at least about 95% the liquefied silver salt. The ion exchange typically is carried out at a temperature above the melting temperature of the silver salt but below the decomposition temperature of either the cryptomelane or the silver salt. A typical temperature range for the ion exchange will be between 200° C. and 800° C. At atmospheric pressure, a typical duration will be at least about 1 hour. Suitable silver salts include the nitrates, sulfate, chlorates, bromides, chlorides, fluorides, and iodides of silver and organic acid silver salts. After ion exchange, the excess salt is removed by washing with a suitable solvent to produce substantially pure silver hollandite.

Previously, silver hollandite has been formed by the thermal decomposition of $AgMnO_4$ and $Ag_2O$ in a 1:1 molar ratio at 970° C. under 5 kbar oxygen over 7 days (see references 11 and 12 below). In contrast, synthesis of silver hollandite via the disclosed ion exchange process is much simpler and facilitates the production of large amounts for industrial applications. In certain embodiments, the silver hollandite can be of high purity with small crystal size and high surface area. Other metals may optionally be introduced into the OMS structure using any of the methods known to the skilled person, such as excess impregnation, dry impregnation, ion exchange, etc.

The disclosed material can have a specific surface area in the range 1 to 300 $m^2/g$, preferably in the range 2 to 300 $m^2/g$, and more preferably in the range 30 to 250 $m^2/g$. The sorption kinetics typically are improved when the specific surface area is high, e.g., greater than 10 $m^2/g$, such as in the range 30 to 250 $m^2/g$.

The sorbent phase can be in the form of a powder, beads, pellets or extrudates and can be deposited or directly prepared on monolithic supports of ceramic or metal. To increase the dispersion of the materials and thus to increase their sorption capacity, the materials can be deposited on porous supports with a high specific surface area before being formed (extrusion, coating . . . ). These supports can be generally selected from the group formed by the following compounds: alumina (alpha, beta, delta, gamma, khi, or theta alumina), silicas ($SiO_2$), silica-aluminas, zeolites, titanium oxide ($TiO_2$), zirconium oxide ($ZrO_2$), magnesium oxide (MgO), divided carbides, for example silicon carbides (SiC), used alone or as a mixture. Mixed oxides or solid solutions comprising at least two of the above oxides can be added.

For many uses, such as in connection with a vehicle exhaust, it is usually preferable to use rigid supports (monoliths) with a large open porosity (e.g., more than 70%) to limit pressure drops that may cause high gas flow rates, and in particular high exhaust gas space velocities. These pressure drops can be deleterious to proper functioning of engines and can contribute to reducing the efficiency of an internal combustion engine (gasoline or diesel). Further, the exhaust system may be subjected to vibrations and to substantial mechanical and thermal shocks, so catalysts in the form of beads, pellets or extrudates run the risk of deterioration due to wear or fracturing.

At least two techniques can be used to prepare the disclosed catalysts on monolithic ceramic or metal supports (or substrates). The first technique comprises direct deposition on the monolithic support, such as using a wash coating to coat the sorbing phase. A wash coating can be prepared, for example, using the operating procedure described in reference 4 below. The sorbent phase can be coated just after the co-precipitation step, hydrothermal synthesis step or heating under reflux step, the final calcining step being carried out on the phase deposited on the monolith. Alternatively, the monolith can be coated after the material has been prepared in its final state, i.e., after the final calcining step.

The second technique comprises depositing the inorganic oxide on the monolithic support and then calcining the monolith between 500° C. and 1100° C. so that the specific surface area of the oxide is in the range of 20 to 150 m²/g. The monolithic substrate covered with the inorganic oxide then can be covered with the sorbent phase prepared, for example, according to the steps described in the reference 4 below.

Monolithic supports that can be used include, but are not limited to: ceramics (such as alumina, zirconia, cordierite, mullite, silica, and alumino-silicates), silicon carbide, silicon nitride, aluminium titanate, metals (such as iron, chromium or aluminium alloys optionally doped with nickel, cobalt, cerium or yttrium) or combinations thereof. The structure of a ceramic supports can be, for example, that of a honeycomb, foam or fibers. Metal supports can be produced by winding corrugated strips or by stacking corrugated sheets to constitute a honeycomb structure with straight or zigzag channels, which may or may not communicate with each other. They can also be produced from metal fibers or wires which are interlocked, woven or braided.

In embodiments in which the supports are made of metal comprising aluminum, it is recommended that the supports be pre-treated at high temperature (for example between 700° C. and 1100° C.) to develop a micro-layer of refractory alumina on the surface. This superficial micro-layer, with a porosity and specific surface area which is higher than that of the original metal, encourages adhesion of the active phase and protects the remainder of the support against corrosion.

The quantity of sorbent phase deposited or prepared directly on a ceramic or metallic support (or substrate) is generally in the range 20 to 300 g per liter of the support, advantageously in the range 50 to 200 g per liter.

Some of the disclosed sorbents can sorb oxides of sulfur present in the gases, in particular exhaust gases. These materials typically are capable of sorbing $SO_x$ at a temperature which is generally in the range 50° C. to 650° C., preferably in the range 100° C. to 600° C., more preferably in the range 150° C. to 550° C. For diesel engines in automobiles, an intended application, the temperature of the exhaust gas may be in the range 150° C. to 500° C. and rarely exceeds 600° C.

The disclosed sorbents may be suitable for sorbing oxides of sulfur present in the exhaust gases of stationary engines or, particularly, automotive diesel engines or spark ignition (lean burn) engines, but also in the gases from gas turbines operating with gas or liquid fuels. These exhaust gases typically contain oxides of sulfur in the range of a few tens to a few thousands of parts per million (ppm) and can contain comparable amounts of reducing compounds (e.g., CO, $H_2$, and hydrocarbons) and nitrogen oxides. These exhaust gases might also contain larger quantities of oxygen (e.g., 1% to close to 20% by volume) and steam, though the disclosed sorbents can be effective in oxygen free environments as well. The disclosed sorbents can be used with HSVs (hourly space velocities), which correspond to the ratio of the volume of the monolith to the gas flow rate, for the exhaust gas generally in the range 500 to 150,000 $hr^{-1}$, for example in the range 5,000 to 100,000 $hr^{-1}$.

In has been found that sorption of $SO_x$ can lead to a noticeable color change in the sorbent. Accordingly, in one variation, a $SO_x$ trap is provided by a quantity of the sorbent contained in a housing having a window. The color of the sorbent material can be periodically monitored through the window with the need to replace or recharge the trap indicated by the color change. In this or other refinements, a spent $SO_x$ trap can be regenerated by appropriate reflux synthesis so as to reuse the sorbent support and the housing.

The disclosed sorbents can be used anywhere $SO_x$ needs to be sorbed. It has been found that significant advantages can be realized in the overall control of emissions from a combustion exhaust by locating the $SO_x$ sorbent upstream from a particulate filter or $NO_x$ trap.

In an exemplary implementation, the disclosed $SO_x$ sorbent material is used in connection with "regenerable" $NO_x$ traps without the need to bypass or otherwise protect the $SO_x$ sorbent during regeneration of the $NO_x$ trap. As discussed more fully in reference 10 below, regenerable $NO_x$ traps are constructed to capture $NO_x$ (for example as nitrate) during normal operation (lean conditions) and then to release the nitrogen (for example as $N_2$) during a brief fuel-rich reduction step (rich conditions). The rich conditions typically last less than about 1 minute, and the lean conditions are typically at least about 5 times the duration of the rich conditions. When the $NO_x$ trap and a $SO_x$ sorbent are arranged in series, the $SO_x$ sorbent also is subject to this lean/rich cycling, unless measures are employed to limit the fuel rich reduction conditions to the $NO_x$ trap. These measures, such as a bypass, can be difficult to implement. Advantageously, no such measures are needed with some embodiments of the disclosed sorbents. For example, in certain embodiments, the sorbents are able to survive lean/rich cycling and still retain substantial sorbent capacity.

In some disclosed embodiments, $SO_x$ sorption is provided by a manganese oxide material which has inherent oxidizing capability, so that $SO_2$ can be oxidized and sorbed without use of a separate and costly oxidation catalyst. The manganese oxide material also may have a high total sorption capacity, such as greater than about 40% by weight, thereby providing economical and efficient emissions control.

As discussed above, silver hollandite can be useful as a $SO_x$ (e.g., $SO_2$) sorbent. Silver hollandite also can be useful as an oxidation catalyst, such as for the catalysis of oxidation of $CO_x$ (e.g., CO), $NO_x$ (e.g., NO), hydrocarbons (e.g., $C_3H_6$) and certain sulfur-containing compounds, such as compounds having at least one thiol group, compounds having at least one sulfide bond, compounds having at least one disulfide bond, and $H_2S$. Silver hollandite performs particularly well as an oxidation catalyst and/or sorbent at low temperatures, such as temperatures between about 50° C. and about 350° C., especially temperatures between about 100° C. and about 200° C. In some implementations, silver hollandite acts as both an oxidation catalyst and as a sorbent. For example, silver hollandite can be used to sorb at least a portion of at least one product of an oxidation process it catalyzes. Such products can include, for example, $SO_2$, which can be sorbed as sulfate.

Silver hollandite's properties make it particularly well suited for use in removing sulfur-containing compounds from a gas or liquid. For example, silver hollandite can be used to remove at least a portion of a sulfur-containing compound, such as an organic sulfur-containing compound, from natural gas or from a liquid hydrocarbon (e.g., gasoline, diesel or jet fuel). Removing a sulfur-containing compound from a liquid hydrocarbon may include rinsing the liquid hydrocarbon with a polar liquid after exposing the liquid hydrocarbon to silver hollandite. For removing sulfur-containing compounds from natural gas, the temperature of the natural gas can be, for example, between about ambient temperature (e.g., about 23° C.) and about 250° C. For removing sulfur-containing compounds from a liquid hydrocarbon, the temperature of the liquid hydrocarbon can be, for example, between about ambient temperature and about 100° C.

Silver hollandite also can be used to remove at least a portion of a nitrogen oxide, such as $NO_2$, from a gas or liquid. For example, silver hollandite can be used to catalyze the reduction of $NO_2$ to form $N_2$ and $O_2$. Such a process can be performed, for example, at a temperature between about 150° C. and about 350° C.

One or more of the disclosed sorbents, such as cryptomelane and silver hollandite, can be combined in the same $SO_x$ trap and/or can be placed in a series configuration in the emissions stream. For example, a $SO_x$ trap comprising silver hollandite can be placed upstream of a $SO_x$ trap comprising cryptomelane.

DETAILED DESCRIPTION

Figure 1:
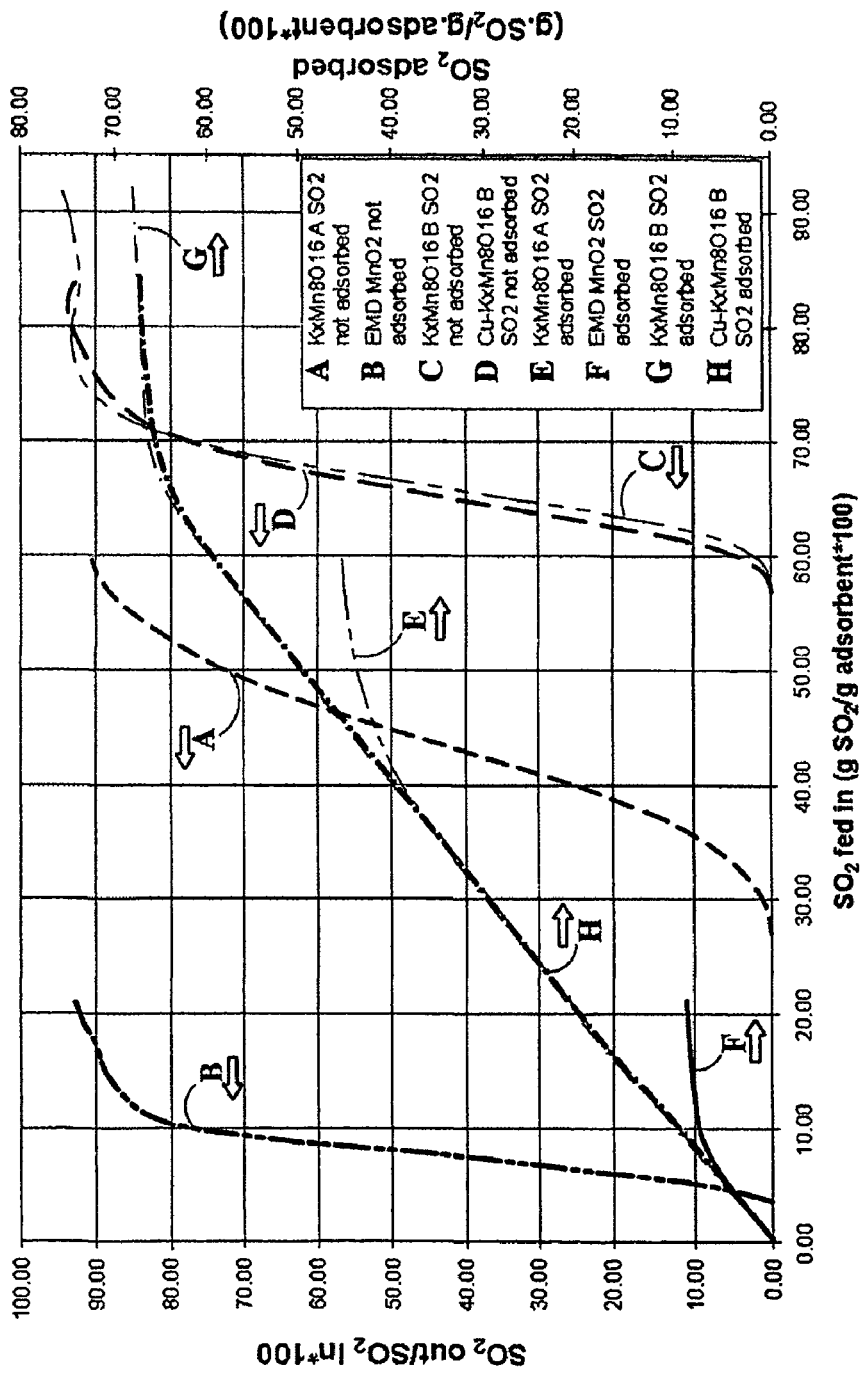
FIG. 1 is a graph showing exemplary plots of the sorption of $SO_2$ on 2×2 Mn—OMS materials and on $MnO_2$.

Reference will now be made to the embodiments illustrated in the drawings and specific language will be used to describe the same. It will nevertheless be understood that no limitation of the scope of the invention is hereby intended. Alterations and further modifications in the illustrated devices, and such further applications of the principles of the invention as illustrated herein are contemplated as would normally occur to one skilled in the art to which the invention relates.

The prefix "sorb" includes adsorption and/or absorption, unless the context indicates otherwise. The separations described herein can be partial, substantial or complete separations unless the context indicates otherwise.

In some disclosed embodiments, a manganese-based octahedral molecular sieve serves as a high-capacity sulfur oxide solid sorbent. As compared to other sorbents studied for the removal of $SO_2$ from waste gases, this material provides surprising high capacity and efficiency. In a preferred form, this material is referred to as Mn—OMS 2×2.

The basic structure of the materials employed in some of the Examples that follow includes $MnO_6$ octahedra joined at the edges to form a 2×2 hollandite tunnel structure with a pore size of about 0.46 nm. For cryptomelane, a counter-cation, $K^+$, is present within the tunne 1 structure for charge compensation. Mn can assume an oxidation state of 4+, 3+, or 2+, and the average Mn oxidation state can be controlled within a certain range during synthesis. Generally, this material has a high surface area (e.g., about 80 $m^2/g$) and a high redox reaction activity.

Without intending to be bound by any theory of operation, the following reaction may be involved in $SO_2$ sorption using cryptomelane:

$$SO_2 + K_xMn_8O_{16} \rightarrow MnSO_4 + K_2O \qquad (1)$$

The $SO_2$ may be oxidized to $SO_3$ by $Mn^{4+}$ and $Mn^{3+}$. The $Mn^{4+}$ and $Mn^{3+}$ may be simultaneously reduced to $Mn^{2+}$ (MnO). The $SO_3$ produced then may react with the $Mn^{2+}$ to form $MnSO_4$.

As explained herein, tunnel structure cryptomelane was found to be a high-capacity sulfur dioxide sorbent. Its $SO_2$ capacity from 250° C. to 475° C. was found to be more than ten times higher than that of conventional $SO_2$ sorbents. Its maximum $SO_2$ capacity can be as high as about 74 wt %. The dominant mechanism for $SO_2$ sorption is believed to be oxidation of $SO_2$ by $Mn^{4+}$ and $Mn^{3+}$ to form $SO_3$, followed by reaction of the $SO_3$ with the co-produced $Mn^{2+}$ to form $MnSO_4$. It has been found that this reaction is primarily controlled by the mass diffusion of $SO_2$ through the sorbent, and that it can surprisingly effectively occur in an oxygen-free environment. In addition, the visibly significant color change of cryptomelane from black to yellow after $SO_2$ sorption can be used as a convenient indicator for the sorbent replacement.

Cryptomelane for $SO_2$ sorption can be synthesized, for example, either from a mixture of $KMnO_4$ and $MnSO_4$ or a mixture of $MnSO_4$ and KOH solution. After $SO_2$ sorption, $MnSO_4$ is formed, which can subsequently be dissolved in water and used as raw material for a subsequent cryptomelane synthesis. To regenerate the $SO_2$ sorption trap, therefore, only KOH and $O_2$ may be needed because the sorbent support (such as a monolith) and the $MnSO_4$ can be re-used.

The disclosed highly-efficient $SO_2$ sorbents can be used for removal of $SO_2$ generated from thermal power plants, factories, and on-road vehicles. They can be especially effective for removal of $SO_x$ that is present in the emissions of diesel trucks, in order to protect downstream emissions control devices such as particulate filters and $NO_x$ traps that are poisoned by $SO_x$.

Silver hollandite, in particular, has utility as a low-temperature oxidation catalyst. For example, silver hollandite can be used as a catalyst for oxidation of $CO_x$ (e.g., CO), $NO_x$ (e.g., NO), hydrocarbons (e.g., hydrocarbons having between one and four carbon atoms, such as $C_3H_6$) and sulfur-containing compounds, such as compounds having at least one thiol group, compounds having at least one sulfide bond, compounds having at least one disulfide bond, and $H_2S$. In general, silver hollandite performs well when oxidation can be accomplished in the gas phase with a continuous flow of oxygen to reactivate the material. Oxidation of sulfur-containing compounds may produce sulfur oxide products, such as $SO_2$, which then can be sorbed by the silver hollandite. Since silver hollandite can act as both an oxidation catalyst and as a sorbent, it can serve as a complete solution for the removal of sulfur-containing compounds.

Silver hollandite also may be useful for catalyzing the reaction of other compounds to convert such compounds into forms that can be sorbed by the silver hollandite. For example, silver hollandite may catalyze the oxidation of phosphites, phosphonates and other reduced phosphorus compounds. The products of the catalyzed oxidation reactions may include phosphates that would likely be sorbed by the silver hollandite. Similarly, silver hollandite may be used to catalyze the oxidation of certain metals and metal-containing compounds into metal oxides that can be sorbed. For example, silver hollandite may be used to catalyze the oxidation of mercury or alkyl mercury compounds into mercuric oxide or to catalyze the oxidation of $AsH_3$ into $As_2O_3$. Toxic metal-containing compounds, such as alkyl mercury compounds and $AsH_3$ might be present, for example, in emissions from coal gasification plants.

In some embodiments, a substantial portion of a sulfur-containing compound, such as a sulfur oxide product, is sorbed by silver hollandite. A substantial portion can be, for example, between about 10% and about 100% of the sulfur-containing compound, such as between about 50% and about 100% or between about 70% and about 100%. These percentages and other percentages recited herein in connection with the term "substantial portion" are weight percentages for a compound within a defined quantity of a gas or liquid undergoing treatment. The defined quantity of gas or liquid undergoing treatment typically is substantially isolated from the surrounding atmosphere. For example, the defined quantity can be a batch of gas or liquid undergoing treatment or a stream of gas or liquid flowing past a device containing silver hollandite for a set amount of time.

Oxidation using silver hollandite as a catalyst can be performed continuously or as a batch process. The process typically results in oxidation of a substantial portion of at least one oxidizable compound in the gas or liquid being treated, such as between about 10% and about 100% of the oxidizable compound, between about 50% and about 100%, or between about 70% and about 100%. In some applications, the gas or liquid to be treated is exposed to silver hollandite at a temperature between the minimum temperature required to provide sufficient kinetic energy for the reaction and a temperature at which the silver hollandite degrades. In some embodiments, the gas or liquid is treated at a temperature between about 50° C. and about 350° C., such as between about 100° C. and about 200° C.

Due to its utility as a catalyst, silver hollandite may be used in place of more expensive catalysts, such as platinum-based catalysts, in many applications. For example, silver hollandite can be used in place of platinum-based catalysts used for $NO_x$, $CO_x$, hydrocarbon, and carbon soot oxidation (e.g., for emissions control) and formaldehyde oxidation (e.g., for indoor pollution abatement).

In some disclosed embodiments, silver hollandite is used as a de-$NO_x$ catalyst. For example, silver hollandite can be exposed to a gas or liquid containing $NO_2$ and catalyze the reduction of the $NO_2$ to form $N_2$ and $O_2$ using a reductant, such as CO or a hydrocarbon. This can be done, for example, at a temperature between about 50° C. and about 400° C., such as between about 150° C. and about 350° C. The process can result in reduction of a substantial portion of a $NO_x$ compound in the gas or liquid, such as between about 10% and about 100% of a $NO_x$ compound, between about 50% and about 100% or between about 70% and about 100%.

Many of the materials disclosed as sorbents and/or catalysts, including cryptomelane and silver hollandite, can be used as oxidation catalysts and/or as sorbents in desulfurization applications, such as the desulfurization of natural gas and liquid hydrocarbons. For example, cryptomelane and silver hollandite can be used to remove organic sulfur-containing compounds from liquid hydrocarbons. Examples of liquid hydrocarbons include gasoline, diesel and jet fuel.

Desulfurization of natural gas has particularly broad utility. Sulfur-containing compounds naturally occur as contaminants in natural gas and often are added to give natural gas a distinctive smell. For many applications, such as analytical applications and fuel cell applications, substantially all sulfur-containing compounds must be removed before natural gas is burned. To accomplish this, natural gas can be exposed to silver hollandite or cryptomelane before use. This can be done, for example at a temperature between about 0° C. and about 350° C., such as between about ambient temperature and about 250° C.

Desulfurization of a gas or liquid using silver hollandite or cryptomelane can be performed continuously or as a batch process. The process typically results in removal of a substantial portion of at least one sulfur-containing compound in the gas or liquid being treated, such as between about 10% and about 100% of the compound to be removed, between about 50% and about 100%, or between about 70% and about 100%. In some applications, the gas or liquid to be treated is exposed to silver hollandite or cryptomelane at a temperature between about 0° C. and about 350° C., such as between about ambient temperature (e.g., about 23° C.) and about 100° C.

Removing a sulfur-containing compound from a liquid hydrocarbon may include rinsing the liquid hydrocarbon with a polar liquid after exposing the liquid hydrocarbon to silver hollandite. This may be useful to remove oxidation products, such as sulfones, that are somewhat polar. Suitable solvents include, for example, solvents with dielectric constants greater than 10, such as water, ethanol, isopropanol, formic acid, acetone, and acetonitrile.

The disclosed molecular sieve materials, such as silver hollandite, also may have utility for removing compounds that cause odors, such as volatile organic compounds released by consumer products, including carpet, paint, etc. Formaldehyde is one such compound. Some of the disclosed materials may be used to catalyze the oxidation of formaldehyde into $H_2O$ and $CO_2$. In comparison to many conventional catalytic materials for removing odors, such as titania-based materials, the disclosed molecular sieve materials typically do not need to be activated by light energy. In some embodiments, however, the disclosed materials are heated to improve their catalytic activity.

In sorption and/or catalysis applications, the disclosed materials may be present in an amount and form that allow sorption and/or catalysis to occur. In catalysis applications, the amount can be, for example, an amount that provides a substantially greater number of catalysis sites at any one time than the amount of potentially oxidizable compound in the feed. For example, in sulfur catalysis and/or sorption applications, the amount of catalyst and/or sorbent can be greater than about 0.1 grams per gram of sulfur in the gas or liquid being treated, such as between about 0.1 and about 100 grams catalyst and/or sorbent per gram of sulfur or between about 0.5 and about 10 grams catalyst and/or sorbent per gram of sulfur. The form can be a form that maximizes surface area, such as a powder form. As discussed above, the disclosed catalytic materials also can be affixed to supports, such as monoliths.

Figure 10:
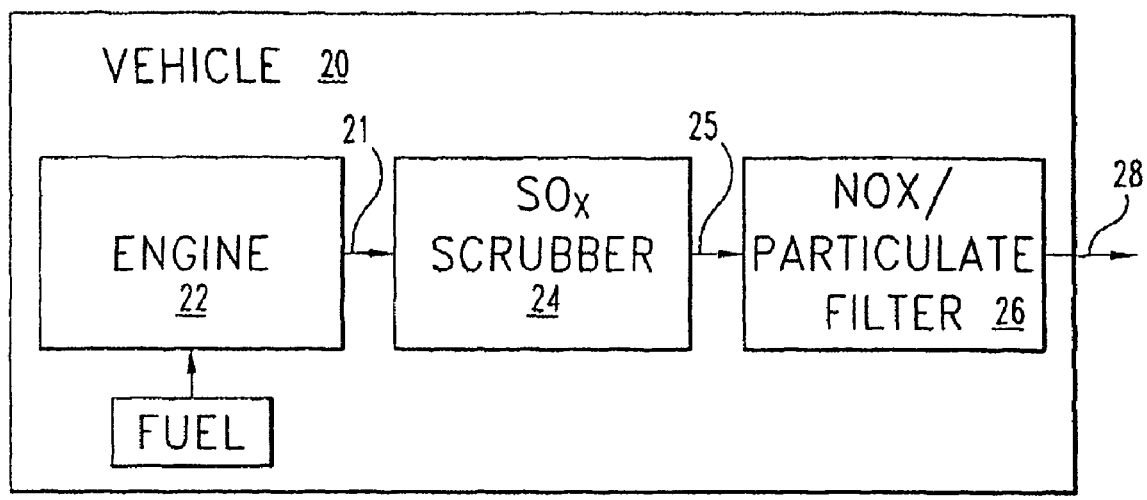
FIG. 10 is a schematic illustration of one embodiment of an emissions control system implemented on a vehicle producing combustion exhaust.

Turning now to FIG. 10, a vehicle 20 implementing a simplified embodiment of the disclosed emissions control system is depicted. Vehicle 20 has an engine 22 fluidly connected to upstream and downstream emissions control devices 24 and 26, respectively. Devices 24 and 26 perform different emissions control functions, and while they could be combined into a single device, as described more fully below, certain problems are avoided by the provision of separate devices.

The exhaust 21 from the engine 22 is first fed to the upstream device 24. The transfer of the exhaust 21, and all other fluid transfer operations, can be in any conventional fashion, such as the exhaust piping of a conventional automobile, and may include intermediate fluid processing operations, such as catalytic conversion, mixing with other gases, or recycling of exhaust to the engine.

The upstream device 24 is a $SO_x$ scrubber functioning to remove any sulfur oxides from the exhaust gas 21 and to prevent their passage via channel 25 to the downstream device 26 and eventually to the atmosphere via the exhaust 28. The $SO_x$ scrubber functions to remove most if not all of any sulfur oxides in the gaseous exhaust 21. The $SO_x$ scrubber can contain a solid $SO_x$ sorbent, as described herein, preferably one supported on a monolith or similar support. The sorbent can function to remove the $SO_x$ from the passing gas stream, such as by permanent or reversible sorption, trapping, filtering, or chemical reaction therewith, and thereby can be used to prevent $SO_x$ from entering the downstream device 26.

The downstream device 26 provides a different emissions control function than the upstream device 24. As illustrated, the downstream device is a $NO_x$ scrubber or particulate filter, although any conventional scrubber or filter can be employed. As many conventional $NO_x$ traps and/or particulate filters are fouled or poisoned by the presence of $SO_x$, the provision of upstream device 24 inventively reduces or eliminates this possibility by providing an inlet stream to device 26 that is substantially $SO_x$ free. For example, it is contemplated that device 24 will function to cause fluid at channel 25 to have less than 1% of the $SO_x$ concentration in the exhaust 21, more preferably less than about 0.1%.

Figure 11:
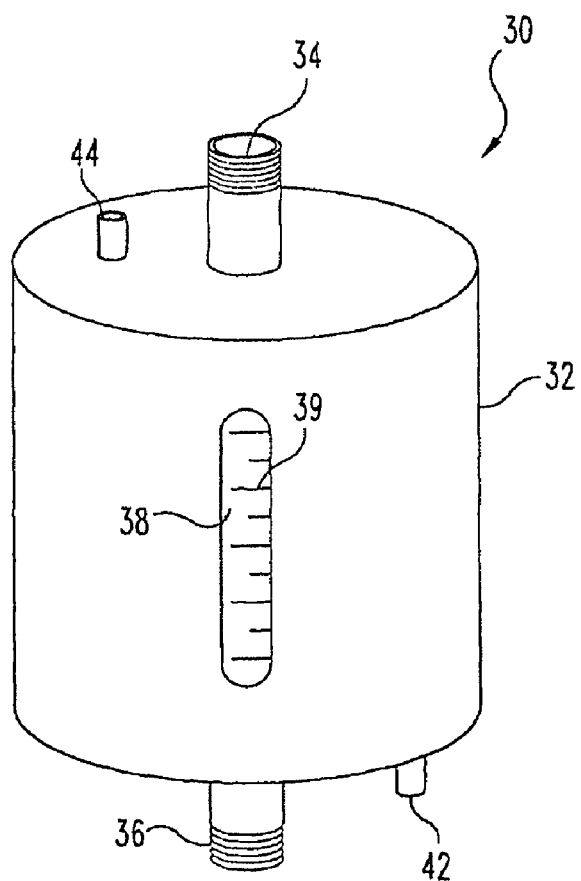
FIG. 11 is a perspective view of one embodiment of a $SO_x$ filter having a monitoring window and regeneration ports.

Turning now to FIG. 11, an exemplary $SO_x$ scrubber 30, which can be employed as device 24 in the FIG. 10 system, is depicted. Scrubber 30 includes a housing 32 having a fluid inlet 34, a fluid outlet 36 and a fluid flow path therebetween. The housing 32 contains a $SO_x$ sorbent in the flow path so as to facilitate the removal of $SO_x$ from the fluid as it passes through the $SO_x$ scrubber.

Housing 32 also contains a window 38 providing visual access to the sorbent contained therein. As the sorbent contained in the housing 32 sorbs the $SO_x$, it will undergo a noticeable color change, with the sorbent nearer the inlet 34 becoming saturated (and thus changing color) sooner than the sorbent near the outlet 36. The resulting transition between different colored portions of the sorbent provides an indication on the extent that the sorbent packing has become spent. Accordingly, a series of indicator marks 39 are provided on the window 38 or on the housing 32 adjacent the window 38 for measuring the remaining sorption capacity of the scrubber 30. For example, during routine maintenance of a machine on which scrubber 30 is implemented, such as vehicle 20, the window 38 can be checked to determine whether replacement of the scrubber 30 is necessary.

When replacement is needed, i.e. when the sorbent is saturated and entirely changed in color, the scrubber 30 can simply be removed from the exhaust stream and replaced. In another embodiment, once removed, the spent sorbent and/or the scrubber 30 can be reused. For example when the spent sorbent is converted to $MnSO_4$, this $MnSO_4$ can be used as a starting material to reform the Mn—OMS material on the support. This reforming can be accomplished, for example, by removing the spent sorbent and its support (such as a monolith) from the housing 32. After processing and appropriate calcinations, the spent sorbent is returned to its OMS structure and is ready to sorb additional $SO_x$.

Alternatively, the necessary reagents for reforming the spent sorbent, for example KOH and $O_2$, can be circulated through the housing 32 without removing the spent sorbent. The inlet and outlet ports 34 and 36 can be used as the reagent inlet and outlet ports to recharge the sorbent in this fashion when the scrubber 30 is removed from the exhaust stream. However, as illustrated, scrubber 30 can include optional dedicated inlet and outlet ports 44 and 42 for this purpose. Ports 42, 44 permit recharging without removal from the exhaust stream, or they may be used in conjunction with offline recharging via inlet and outlet 34, 36.

Reference will now be made to examples illustrating specific features of inventive embodiments. It is to be understood, however, that these examples are provided for illustration and that no limitation to the scope of the invention is intended thereby. Further, certain observations, hypotheses, and theories of operation are presented in light of these examples in order to further understanding, but these are likewise not intended to limit the scope of the invention.

EXAMPLES

The following examples are provided to illustrate certain particular embodiments of the disclosure. Additional embodiments not limited to the particular features described are consistent with the following examples.

Example 1

Sample Preparations and Test Conditions OMS 2×2

2×2 manganese based octahedral molecular sieve (tunnel structure cryptomelane) was prepared using the methods described in reference 3 below. A typical synthesis was carried out as follows: 11.78 g $KMnO_4$ in 200 ml of water was added to a solution of 23.2 g $MnSO_4.4H_2O$ in 60 ml of water and 6 ml of concentrated $HNO_3$. The solution was refluxed at 100° C. for 24 hours, and the product was washed and dried at 120° C. Hydrothermal reaction in Teflon bottles at 90° C., instead of the reflux method, was also used for the synthesis. In one example, this approach yielded cryptomelane with a density of 0.66 g/cm$^3$ and a surface are of 74.1 m$^2$/g.

An alternative synthesis method for cryptomelane included purging $O_2$ through a mixture of $MnSO_4$ and KOH solution, followed by calcination at 600° C. A typical preparation was: a solution of 15.7 g KOH in 100 ml of cold water was added to a solution of 14.9 g of $MnSO_4 \cdot H_2O$ in 100 ml of water. Oxygen gas was bubbled (about 10 L/min) through the solution for 4 hours. The product was washed with water and calcined in air for 20 hours. In one example, this approach yielded cryptomelane with a density of 0.99 g/cm$^3$ and a surface are of 32.0 m$^2$/g.

The dried materials were sieved to provide 40-80 mesh particles for the $SO_2$ sorption tests, which was carried out in a temperature controlled reactor with a Sulfur Chemiluminescent Detector (SCD) analysis system. Unless otherwise stated, the sorption testing conditions were 0.5 gram 40-80 mesh sorbent particles, 100 standard cubic centimeters per minute (sccm) exhaust air flow with 250 parts per million (ppm) $SO_2$, 75% $N_2$, 12% $O_2$, and 13% $CO_2$.

The $SO_2$ sorption performance of cryptomelane material synthesized by refluxing mixture of $KMnO_4$ and $MnSO_4$ solutions was also systemically tested under different temperature, gas hour space velocity (GHSV), $SO_2$ concentrations, and feed gas compositions. The results are summarized in Table 1.

Before each $SO_2$ sorption measurement, the material was heated at 500° C. for 2 hours in flowing air. To characterize the property changes before and after $SO_2$ sorption, powder X-ray diffraction pattern (XRD), particle surface area (SA), and scanning electron microscopy (SEM) images were collected on some of the tested materials.

Example 2

Comparative

Comparative Breakthrough Sorption Capacities

For purposes of comparison, the $SO_2$ sorption capabilities of several commercially available materials were tested at a temperature range from 250° C. to 475° C. under the testing conditions indicated above (0.5 gram 40-80 mesh sorbent particles, 100 sccm exhaust air flow with 250 ppm $SO_2$, 75% $N_2$, 12% $O_2$, and 13% $CO_x$). The tested materials included $La_2O_3$ or BaO doped $ZrO_2$—$CeO_2$ mixtures (from Daiichi Kigenso Kagaku Kogyo Co., Ltd.), $ZrO_2$ (from RC100, Inc.), A1203 (from Engelhard, acidic), CaO (from Alfa Aesar, Inc.), and $MnO_2$ (from Erachem Comilog, Inc.). These materials were obtained from their respective commercial sources.

Table 2 presents a summary of the $SO_2$ sorption capacities for some of these $SO_2$ sorbents. The $SO_2$ sorption capacity was calculated based on weight of $SO_2$ sorbed per gram of sorbent when 1% of the initial $SO_2$ concentration was observed eluting from the sorbent bed. This is defined as the breakthrough sorption capacity. As seen in Table 2, the $SO_x$ breakthrough sorption capacities for these materials are generally less than 5 wt %. Of the other materials tested, the sorption capacities for the $MnO_2$ was selected for more direct comparison to the materials of Example 1 and are presented in the Examples below.

TABLE 1

$SO_2$ Sorption Test Conditions for Cryptomelane Material

| Variable conditions | Other conditions |
|---|---|
| $SO_2$ sorption temperature<br>250° C., 325° C.,<br>and 475° C. | 0.5 g 40-80 mesh sorbent,<br>feed gas: 250 ppm $SO_2$, 82%<br>$N_2$, 18% $O_2$, ~8,000 hr$^{-1}$ GHSV |
| Gas Hour Space Velocity, GHSV, hr$^{-1}$<br>8,000,<br>30,000,<br>and 60,000 | 0.5 g 40-80 mesh sorbent for<br>8K and 30K hr$^{-1}$ GHSV test,<br>and 0.25 g for 60K test,<br>325° C., feed gas: 250 ppm $SO_2$,<br>82% $N_2$, 18% $O_2$, |
| $SO_2$ concentration in feed gas<br>50 ppm<br>and 250 ppm | 0.5 g 40-80 mesh sorbent for<br>250 ppm $SO_2$ test, and 0.25 g<br>for 50 ppm test<br>325° C., feed gas: 82% $N_2$, 18%<br>$O_2$, ~30,000 hr$^{-1}$ GHSV, |
| Feed gas composition<br>Air<br>(250 ppm $SO_2$, 82% $N_2$ and 18% $O_2$)<br>$CO_2$ effect<br>(250 ppm $SO_2$, 75% $N_2$, 12% $O_2$, and 13% $CO_2$)<br>NO effect<br>(178 ppm $SO_2$, 178 ppm NO, 9% $N_2$, 20% $O_2$,<br>71% He)<br>CO effect<br>(250 ppm $SO_2$, 250 ppm CO, 87% $N_2$, 13% $O_2$)<br>CO—NO—$H_2O$ effect<br>(125 ppm $SO_2$, 125 ppm CO, 125 ppm NO, 11% $H_2O$*,<br>19% $N_2$, 20% $O_2$, 50% He)<br>$O_2$-free effect<br>(250 ppm $SO_2$, 12.5% $N_2$, and 87.5% He) | For CO—NO—$H_2O$ test<br>0.25 g 40-80 mesh sorbent,<br>325° C., 17K hr$^{-1}$ GHSV<br>For others<br>0.5 g 40-80 mesh sorbent,<br>325° C., ~8K hr$^{-1}$ GHSV |

*Steam was introduced by purging $O_2$ through a flask containing temperature-controlled deionized water. After passing through the sorbent, the steam was removed before analysis with the SCD detector. The steam was removed using a MD Gas Dryer (from Perma Pure Inc.), which can selectively separate $H_2O$ from other gases in the mixture.

TABLE 2

SO₂ Breakthrough Sorption Capacity of Conventional SO₂ Sorbents

| Materials tested | 200° C. | 325° C. | 400° C. | 475° C. |
| --- | --- | --- | --- | --- |
| 73.8% ZrO₂—26.2% CeO₂ mixed oxide SA 53.5 m²/g, 10,000 hr⁻¹ GHSV | | 2.2 wt % | 2.2 wt % | 2.2 wt % |
| 73.2% ZrO₂, 1.75% La₂O₃, 5.22% Nd₂O₃, and 19.9% CeO₂ mixed oxide SA 60.3 m²/g, 7236 hr⁻¹ GHSV | | 2.4 wt % | 3.1 wt % | 3.6 wt % |
| 61.8% ZrO₂, 29.4% CeO₂, and 8.9% La₂O₃ mixed oxide SA 69.1 m²/g, 11,400 hr⁻¹ GHSV | 2.0 wt % | 3.5 wt % | 5.0 wt % | 5.3 wt % |
| 70.3% ZrO₂, 4.0% BaO, and 25.8% CeO₂ mixed oxide SA 29.2 m²/g, ~10,000 hr⁻¹ GHSV | | 1.7 wt % | 1.7 wt % | 2.5 wt % |
| ZrO₂, SA 95.7 m²/g, 10,000 hr⁻¹ GHSV | | | | 2.2 wt % |
| Al₂O₃, Engelhard Corp. SA 150 m²/g, Acidic 7,281 hr⁻¹ GHSV | | 1.0 wt % | | |
| CaO, SA 2.7 m²/g, ~10,000 hr⁻¹ GHSV | | <0.2 wt % | <0.2 wt % | <0.2 wt % |

1. Other test conditions: 0.5 g 40-80 mesh sorbent, feed gas: 250 ppm SO₂, 75% N₂, 12% O₂, and 13% CO₂
2. SO₂ capacity based on gram of SO₂ sorbed per gram of catalyst at 1% SO₂ breakthrough point Example 3

Breakthrough Sorption Capacities

Table 3 gives the $SO_2$ breakthrough and total sorption capacities of the materials synthesized according to Example 1, $K_xMn_8O_{16}A$ (reflux synthesis, with projected final average Mn oxidation state 3.5⁺), $K_xMn_8O_{16}B$ (reflux synthesis, with projected final average Mn oxidation state 4⁺), Cu-doped $K_xMn_8O_{16}B$ (hydrothermal synthesis, with projected final average Mn oxidation state 4⁺), and $K_xMn_8O_{16}C$ (synthesized from $MnSO_4$ and KOH). The projected final Mn oxidation state (PAOS) is calculated based on the relative amount of $KMnO_4$ and $MnSO_4$ in the starting solution, i.e. PAOS = (moles of $KMnO_4*7$ + moles of $MnSO_4*2$)/(moles of $KMnO_4$ + moles of $MnSO_4$). Breakthrough capacities were measured at 1% breakthrough as described in Example 2, and total $SO_2$ sorption capacity was also measured with the values given in parentheses in Table 3. For example, the breakthrough and maximum $SO_2$ sorption capacities for $K_xMn_8O_{16}B$ are 58 wt % and 68 wt %, respectively. Under similar reaction conditions, these materials have significantly higher breakthrough $SO_2$ sorption capacity than the conventional $SO_2$ sorbents given in Table 2. To facilitate comparison, the results for the commercially obtained electrolytic $MnO_2$ (EMD, Erachem Comilog, Inc.) discussed above are presented in Table 3.

TABLE 3

SO₂ Sorption Capacity of Cryptomelane Materials Synthesized

| Materials tested | SA, m²/g | SO₂ breakthrough capacity (total capacity) |
| --- | --- | --- |
| K$_x$Mn$_8$O$_{16}$ A, 14,000 hr⁻¹ GHSV | 51 | 28 (45)[b] wt % |
| Cu-doped K$_x$Mn$_8$O$_{16}$ B[a] 9,637 hr⁻¹ GHSV | 88 | 57.5 (67) wt % |
| K$_x$Mn$_8$O$_{16}$ B, ~7500 hr⁻¹ GHSV | 74 | 58 (68) wt % |
| K$_x$Mn$_8$O$_{16}$ C, ~8000 hr⁻¹ GHSV | 32 | 48 (60) wt % |
| EMD MnO₂, 12,000 hr⁻¹ GHSV | 30 | 3.5 (9) wt % |

*Other test conditions: 0.5 g 40-80 mesh sorbent, 325° C., feed gas: 250 ppm SO₂, 82% N₂, and 18% O₂ for K$_x$Mn$_8$C$_{16}$ C, for others: 75% N₂, 12% O₂, and 13% CO₂
[a] CuSO₄ was added in MnSO₄ solution
[b] Data in parentheses are maximum SO₂ sorption capacities Example 4

SO₂ Sorption at 325° C.

FIG. 1 is a graph showing plots of $SO_2$ sorption on $K_xMn_8O_{16}A$, B, Cu-doped $K_xMn_8O_{16}B$, and EMD $MnO_2$, as a function of the weight percentage of $SO_2$ fed at 325° C. The left axis is the percentage of $SO_2$ not sorbed (i.e. that passed through the bed) and corresponds to the S-shaped curves. The right axis is the wt % $SO_2$ sorbed and corresponds to the curves whose slope is initially 1 at low feed amounts and then tends towards slope of zero at high feed amounts. All weight percentages are relative weight of sorbent.

Example 5

Changes After Sorption

Figure 2A:
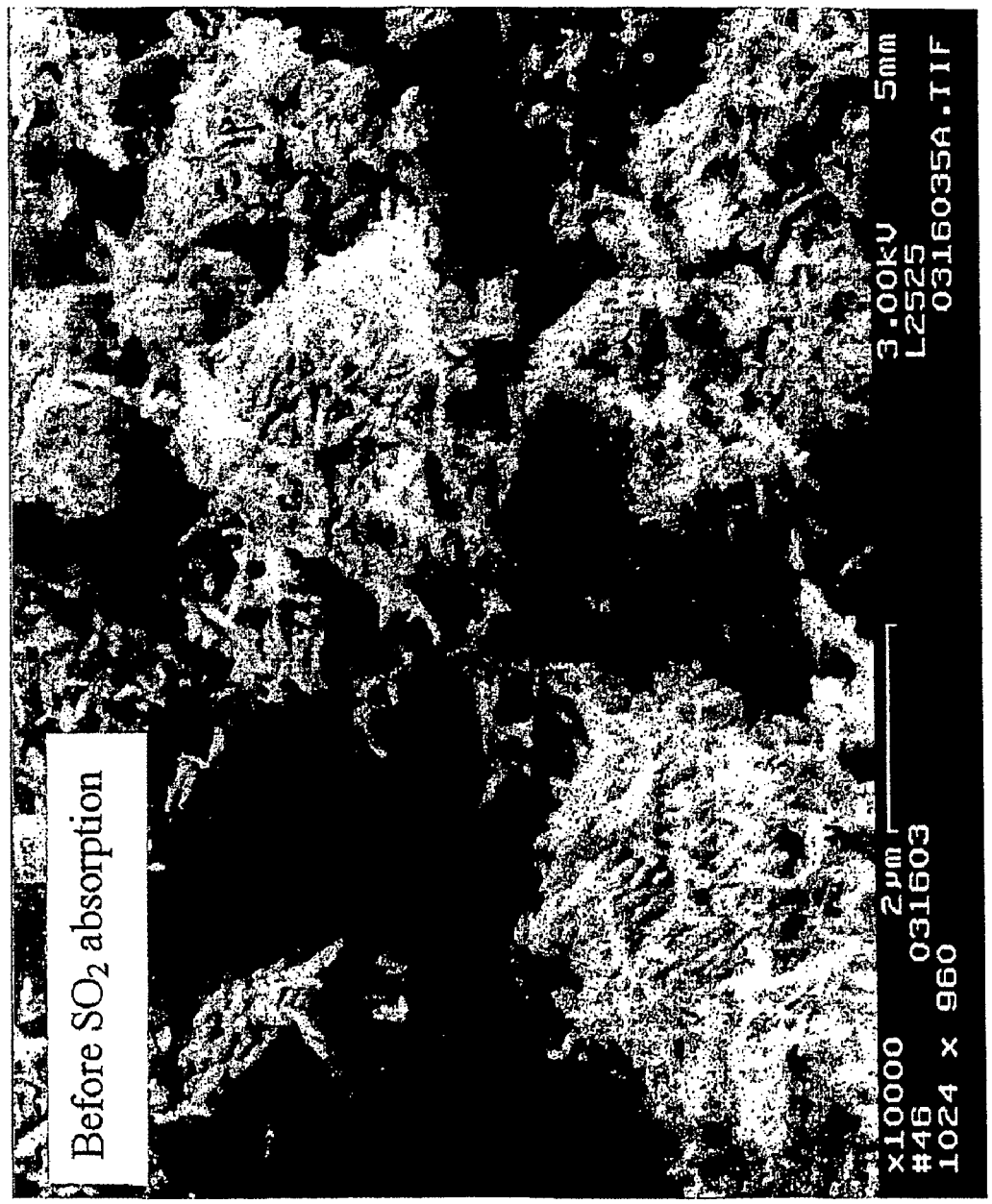
FIGS. 2a and 2b are exemplary scanning electron microscopy images of a 2×2 Mn—OMS material before and after $SO_2$ sorption, respectively.
Figure 2B:
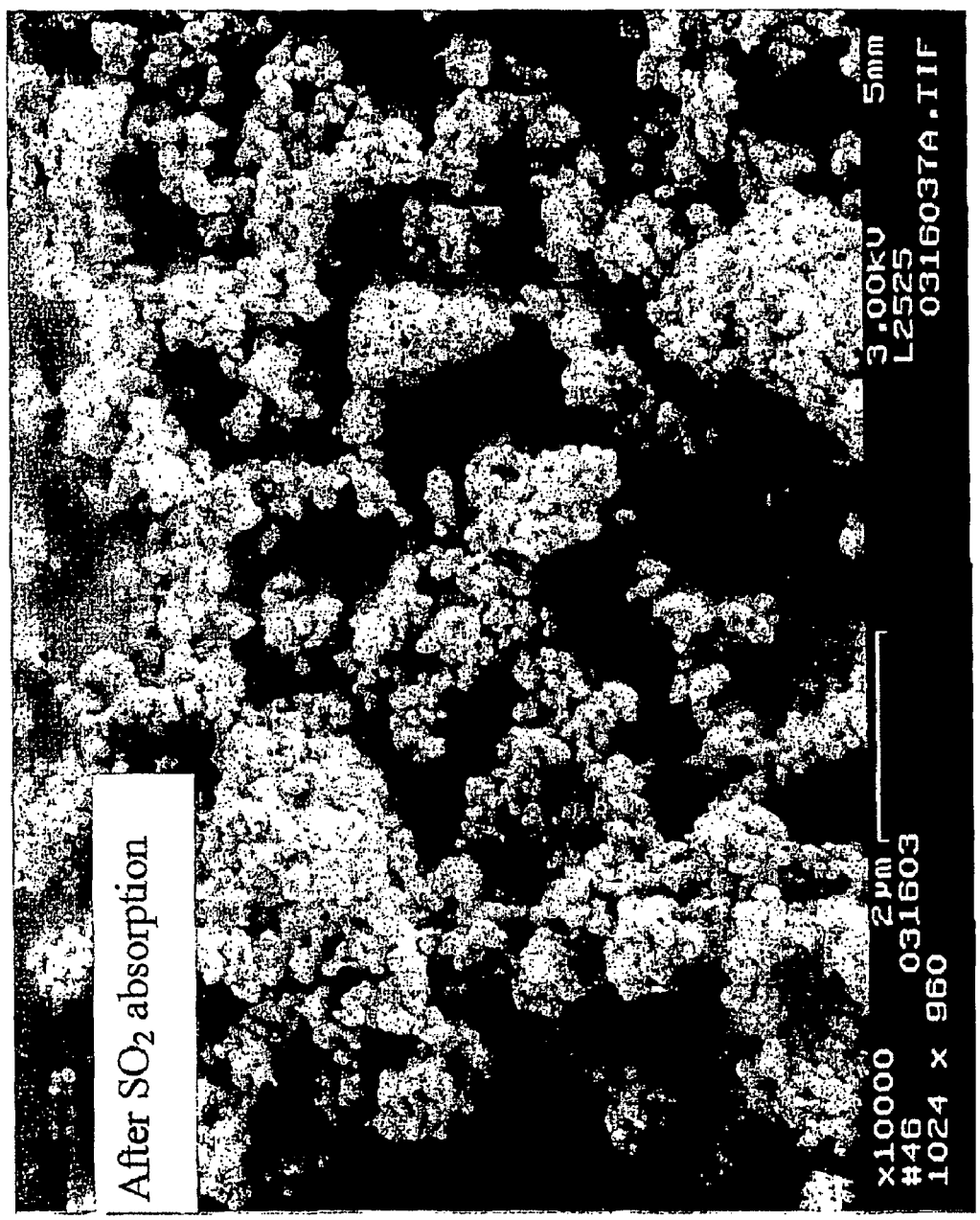
Figure 3A:
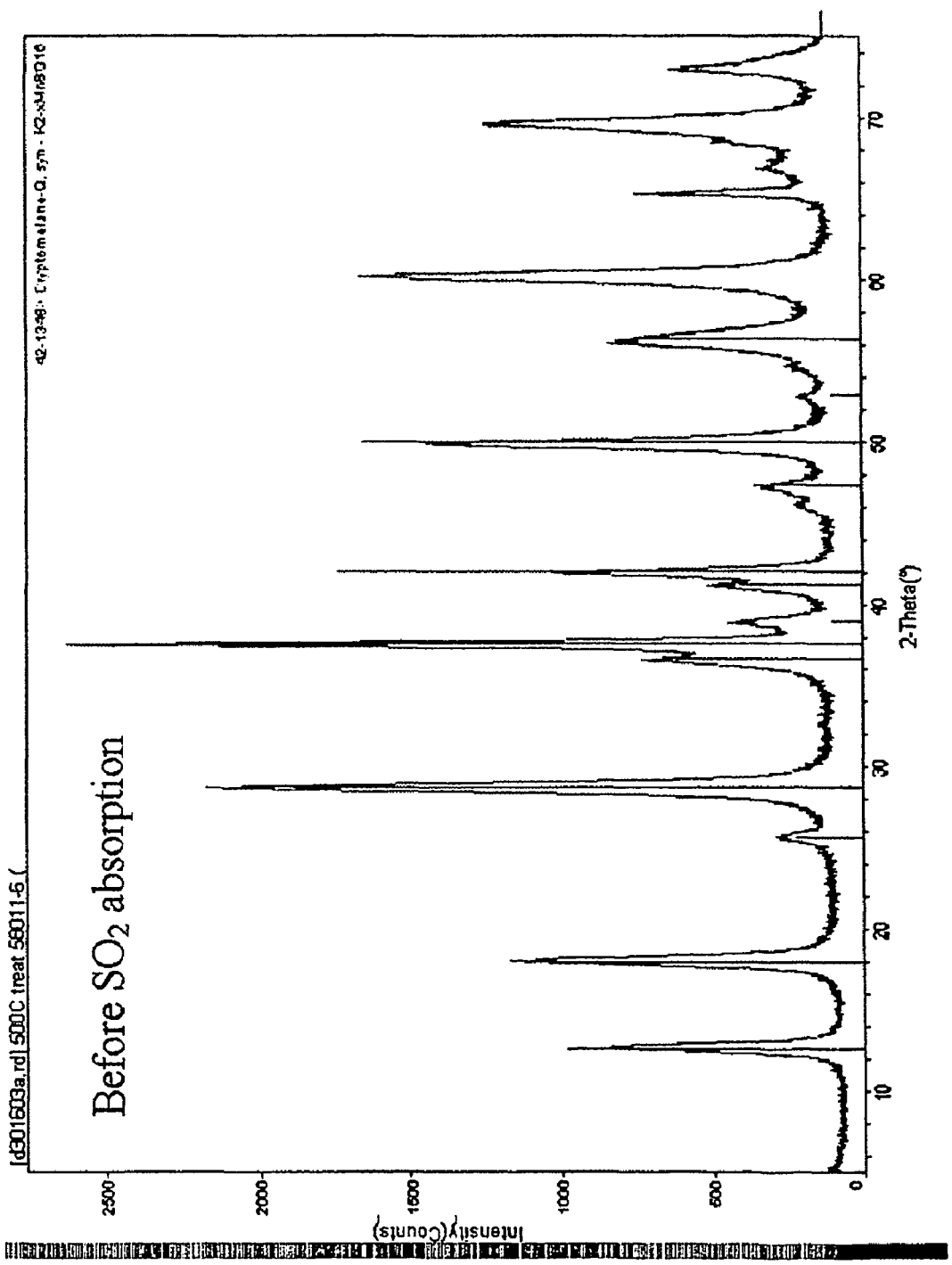
FIGS. 3a and 3b are exemplary x-ray diffraction patterns of a 2×2 Mn—OMS material before and after $SO_2$ sorption, respectively.
Figure 3B:
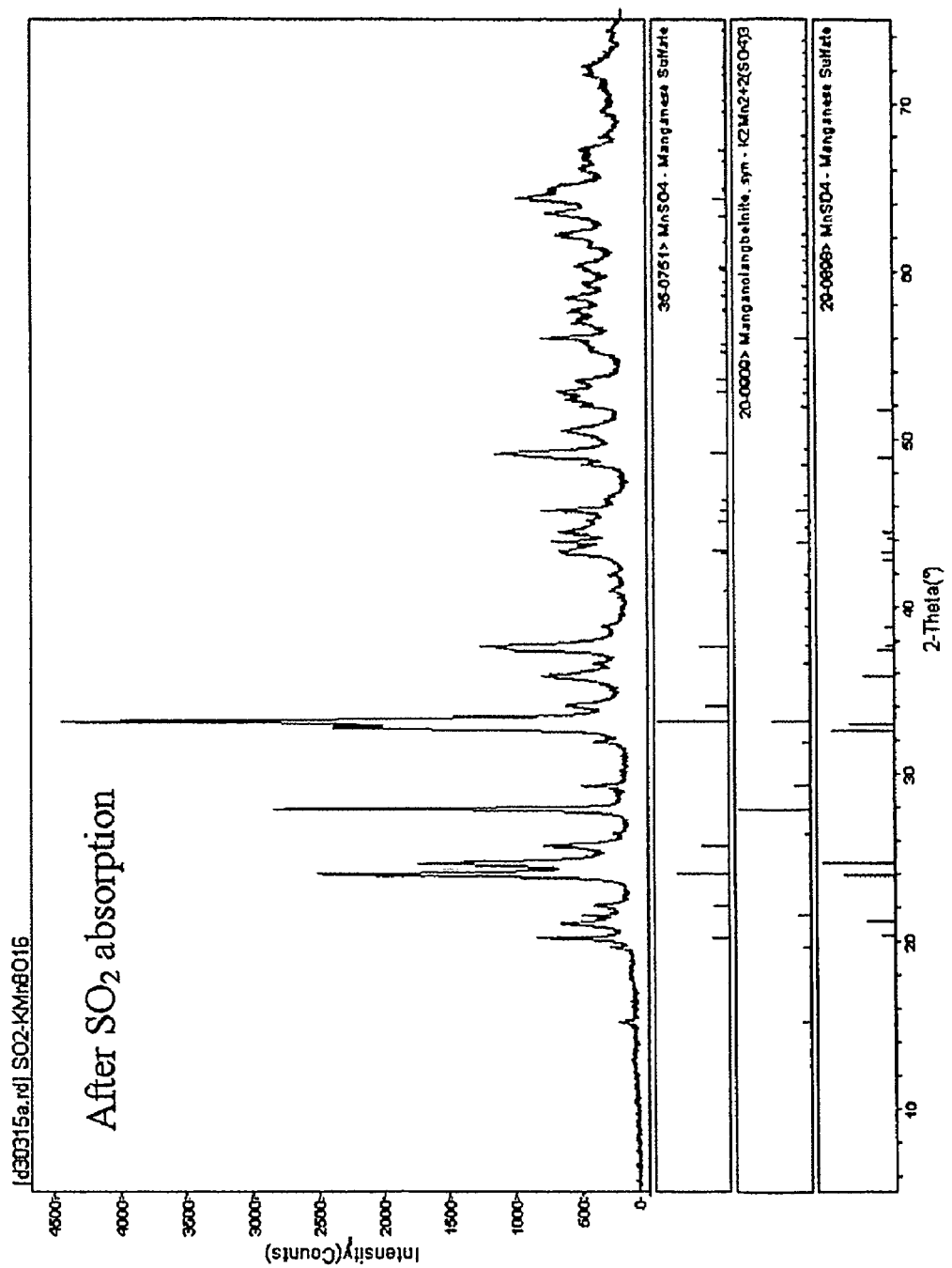
Figure 4:
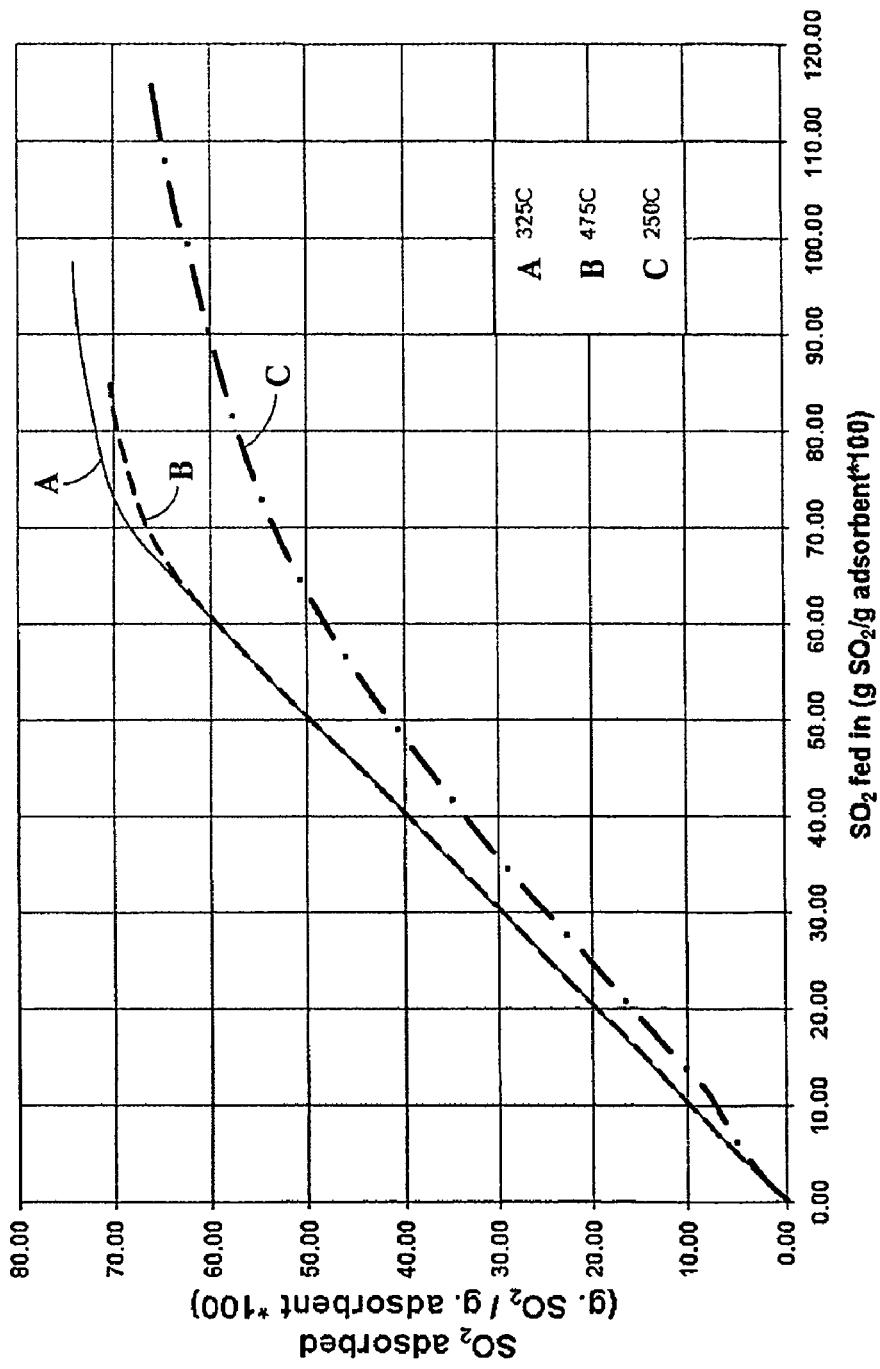
FIG. 4 is a graph showing exemplary plots of the sorption of $SO_2$ on a Mn—OMS material at different gas feed temperatures.

FIGS. 2 and 3 are before and after scanning electron microscopy (SEM) images and x-ray diffraction patterns (XRD), respectively, for the $SO_2$ sorption by $K_xMn_8O_{16}B$ at 325° C. As shown in FIG. 2, the morphology and the crystal structure of the $K_xMn_8O_{16}$ material significantly changes after $SO_2$ sorption.

The surface area of this material also decreased sharply from 74 m²/g to 4.6 m²/g, and the XRD patterns indicate that the OMS structure had converted to a mixture of $MnSO_4$ and manganolangbeinite $K_2Mn_2(SO_4)_3$. A visible color change in the sorbent was also evident. It was initially black and changed to yellow after the $SO_2$ sorption.

Example 6

Temperature Dependence

Figure 5:
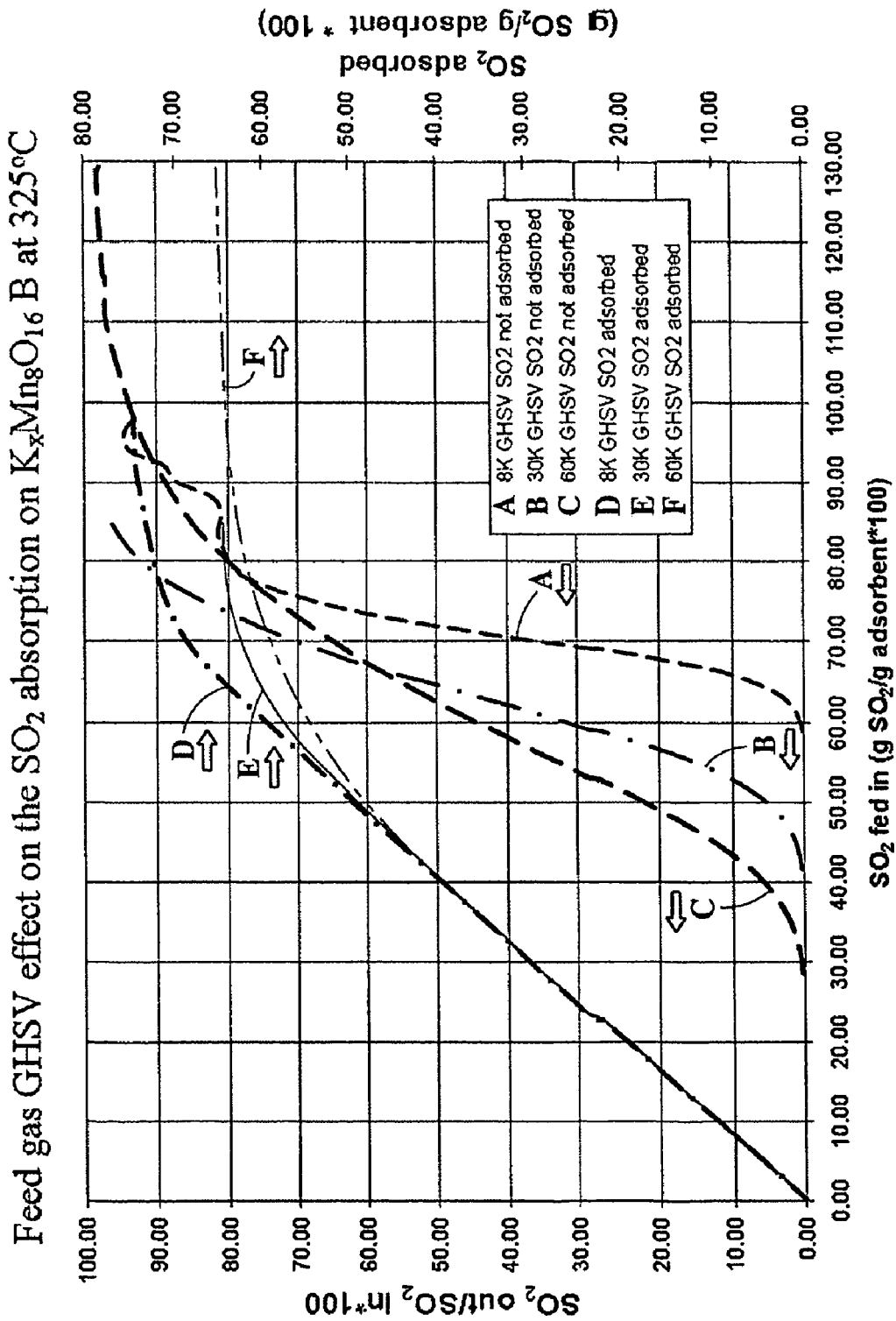
FIG. 5 is a graph showing exemplary plots of the sorption of $SO_2$ on a Mn—OMS material at different gas feed rates.

FIG. 5 is a plot of the wt % of $SO_2$ sorption on $K_xMn_8O_{16}B$ at 250° C., 325° C. and 475° C. under the other test conditions as indicated in Table 1 (0.5 g 40-80 mesh sorbent, feed gas: 250 ppm SO₂, 82% N₂, 18% O₂, about 8,000 hr⁻¹ GHSV). Even at as low a temperature as 250° C., this material could sorb more than 66 wt % $SO_2$, although sorption is not 100% and some $SO_2$ breakthrough was observed even initially.

Example 7

Feed Gas Flow Rate Dependence

Figure 6:
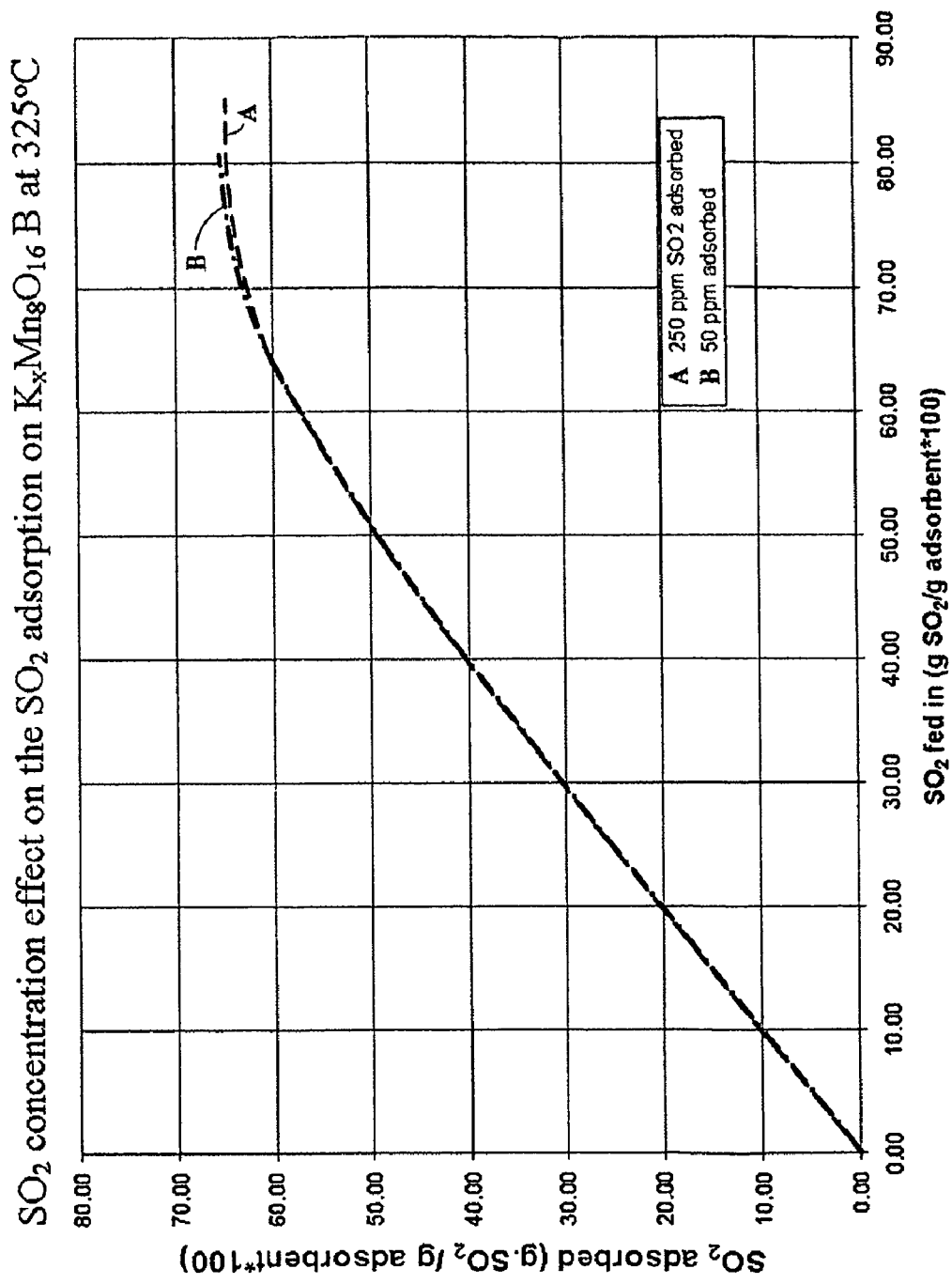
FIG. 6 is a graph showing exemplary plots of the sorption of $SO_2$ on a Mn—OMS material at different concentrations of $SO_2$ in the feed gas.

FIG. 6 shows the feed gas GHSV effect on the $SO_2$ sorption with $K_xMn_8O_{16}B$ at 325° C. The breakthrough $SO_2$ capacity decreased from 61, to 44, and 33 wt % as the feed GHSV increased from 8K, to 30K and 60K $hr^{-1}$. As the feed GHSV increased, the total $SO_2$ sorption capacity decreased, but not significantly, from 74 to 64 and 63 wt %.

Example 8

Feed Gas Composition Dependence

Figure 7:
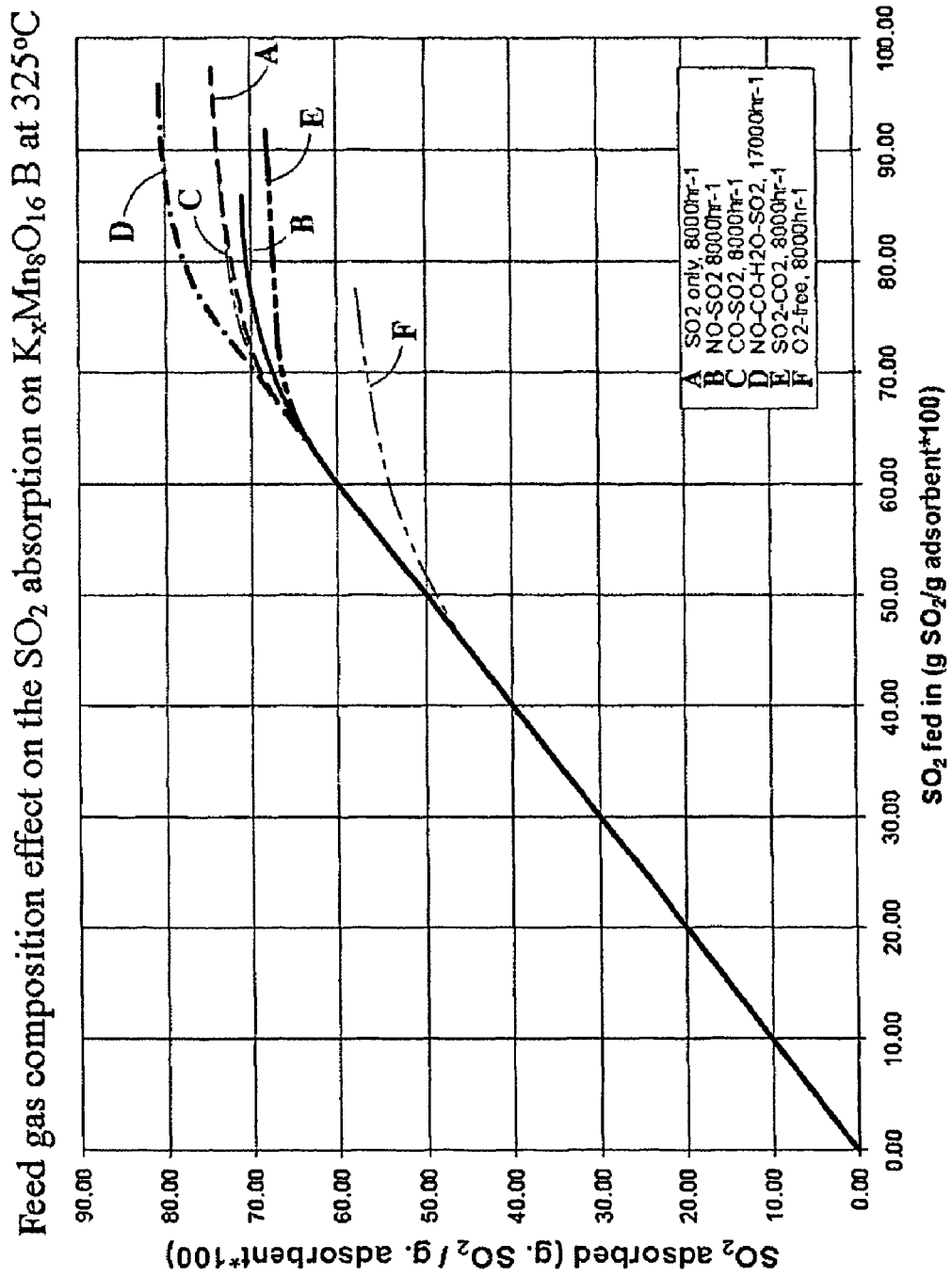
FIG. 7 is a graph showing exemplary plots of the sorption of $SO_2$ on a Mn—OMS material at different feed gas compositions.

FIG. 7 shows that increasing the $SO_2$ concentration in the feed gas from 50 ppm to 250 ppm had almost no effect on the $SO_2$ sorption with $K_xMn_8O_{16}B$.

Figure 8:
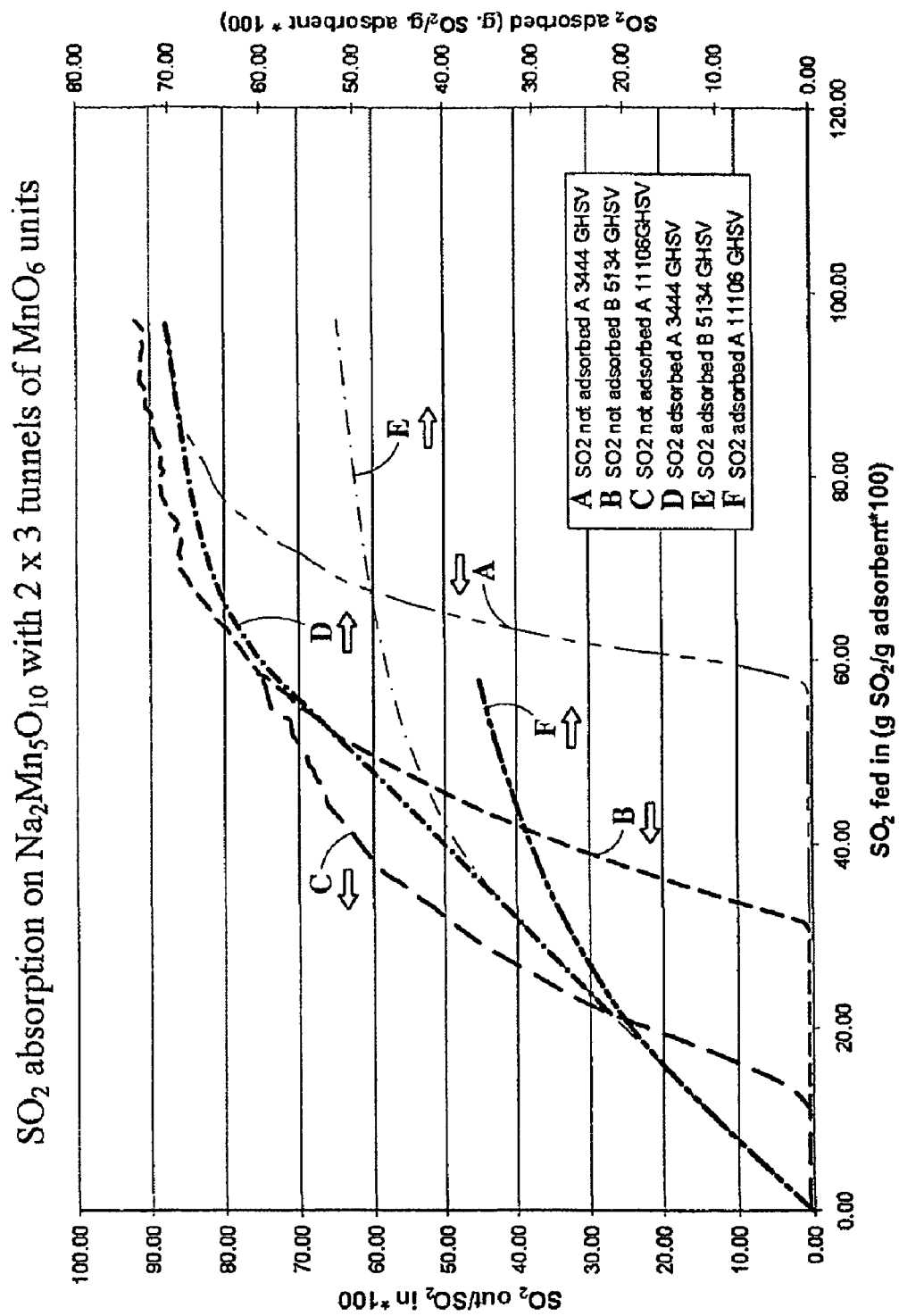
FIG. 8 is a graph showing exemplary plots of the sorption of $SO_2$ on 2×3 Mn—OMS materials at different gas feed rates.

FIG. 8 shows the effect of the feed gas composition on the sorption of $SO_2$ with $K_xMn_8O_{16}B$ at 325° C. CO and NO, which can be present in combustion waste gases, did not have any effect on the $SO_2$ sorption with $K_xMn_8O_{16}$. $CO_2$, at about 13%, slightly deceased the $SO_2$ breakthrough capacity (from 61 wt % to 59 wt %) and the total $SO_2$ capacity (from 74 wt % to 68 wt %).

Surprisingly, the OMS material $K_xMn_8O_{16}B$ showed a higher $SO_2$ breakthrough capacity of 74 wt % and total $SO_2$ capacity of about 80 wt % in the CO—NO—$SO_2$—$H_2O$ mixture feed gas even through the GHSV was 17K $hr^{-1}$. When steam was introduced into the system, the SCD signals were not very stable, which may have generated some error in the measurements. In the absence of $O_2$, cryptomelane material $K_xMn_8O_{16}B$ still had a $SO_2$ breakthrough capacity of 41 wt % and a total $SO_2$ capacity of 58 wt %.

After the $SO_2$ sorption test, the weight gain of the sorbent was measured, though it was not possible to collect all the sorbent particles. Table 4 gives the weight gain data of the feed gas composition trials. For comparison, the total $SO_2$ sorption calculated from the SCD concentration change for each test also is listed.

TABLE 4

Sorbent Weight Gain after $SO_2$
Sorption Test in Different Feed Gas Compositions at 325° C.

| Feed Gas | Air | $CO_2$ effect | CO effect | NO effect | $O_2$-free effect | CO—NO—$H_2O$ effect |
|---|---|---|---|---|---|---|
| Weight Gain, % | 65.7 | 65.6 | 66.2 | 64 | 50 | 66.8 |
| Total $SO_2$ sorbed, % | 74.6 | 68.1 | 74.1 | 70.7 | 58 | 80.6 |

*See Table 1 for detailed test conditions

Discussion of Examples 1-8

Based on reaction (1), the maximum $SO_2$ capacity is believed to be controlled by the oxidation state of Mn in the sorbent. For the OMS materials $K_xMn_8O_{16}B$ and Cu-doped $K_xMn_8O_{16}B$, the average projected oxidation state of Mn is 4; there are very few $K^+$ cations present in the structure. If the small amount of $K^+$ is ignored, the maximum $SO_2$ capacity should be about 73.5 wt %. The measured maximum $SO_2$ capacities (see Tables 3 and 4) are about 70 wt % for these two materials, which is very close to 73.5 wt % and reflects the contribution of the $K_2O$ byproduct. This result supports the hypothesis that reaction (1) dominates $SO_2$ sorption. Direct evidence is also seen in the XRD patterns before and after the $SO_2$ sorption. After $SO_2$ sorption, the OMS structure completely changed to $MnSO_4$ and manganolangbeinite $K_2Mn_2(SO_4)_3$. The formation of $K_2Mn_2(SO_4)_3$ means more $SO_4^{2-}$ than $Mn^{2+}$ is formed and that reaction (1) needs to be modified slightly. A postulate is that the cryptomelane material itself or the $SO_2$ sorbed material (mostly $MnSO_4$) acts as a catalyst for the following reaction and formation of $K_2Mn_2(SO_4)_3$.

$$SO_2 + O_2 \rightarrow SO_3 \qquad (2)$$

Because the amount of $K^+$ is small, the whole $SO_2$ sorption process is mostly dominated by manganese oxidation. It should be noted that, while the presence of $O_2$ in the feed gas does help increase sorption, it is not necessary, as demonstrated by the satisfactory sorption performance in the oxygen-free feed gas test (feed gas composition: 250 ppm $SO_2$, 12.5% $N_2$, and 87.5% He). After $SO_2$ sorption in an $O_2$-free environment, both $MnSO_4$ and $K_2Mn_2(SO_4)_3$ were formed, suggesting that other reactions involving oxygen transfer and formation of some amorphous phases also happened in an $O_2$-free environment.

The synthesized $K_xMn_8O_{16}A$ had an average projected Mn oxidation state of +3.5. The ideal formula for this material should be $K_4Mn_8O_{16}$ (after water removal at 500° C. and assuming all the counter-cations are $K^+$). Then according to reaction (1), the maximum capacity is 45 wt %, which exactly matches the measurement (see Table 3). If reaction (2) also exists with this material, $K_2Mn_2(SO_4)_3$ should form, which was not seen in an XRD pattern (not shown), and the maximum $SO_2$ capacity should be 60 wt %. This suggests that reaction (1) predominates, and that reaction (2) occurs only to a very small extent or not at all. Based on the results from $K_xMn_8O_{16}A$ (hydrothermal synthesis, with projected final average Mn oxidation state 3.5), $K_xMn_8O_{16}B$ (reflux synthesis, with projected final average Mn oxidation state 4) and Cu-doped $K_xMn_8O_{16}B$ (hydrothermal synthesis, with projected final average Mn oxidation state 4), neither the choice between reflux or hydrothermal synthesis, nor doping with Cu significantly changes $SO_2$ break through sorption capacity or maximum sorption capacity. This suggests that there is no kinetic or thermodynamic effect attributable to doping or the synthesis mechanism.

The alternative synthesis method of purging $O_2$ through a mixture of $MnSO_4$ and KOH solution followed by calcination at 600° C. did show some effect. $K_xMn_8O_{16}$ synthesized using this method, gives ~50 wt % $SO_2$ breakthrough capacity and ~60 wt % $SO_2$ total capacity, which are lower than those for $K_xMn_8O_{16}B$. Potential reasons for this disparity include 1) possible incomplete oxidation of $Mn^{2+}$ to $Mn^{4+}$, 2) the relative low surface area (32 $m^2/g$ vs. 75 $m_2/g$) and high density (~1 $g/cm^3$ vs. 0.67 $g/cm^3$), and 3) the product is not pure OMS as a small amount of $K_2SO_4$ was found to exists (see FIG. 9 for its XRD pattern). While the synthesis conditions could still be optimized to improve sorption performance, the sorption performance is adequate to be effective and consideration of other factors renders this a desirable approach. For example, this synthesis method can significantly decrease the overall cost of the sorbent production. After $SO_2$ sorption, almost pure $MnSO_4$ is formed, which, being one of the starting materials, can be recaptured and reused. Also the density of $K_xMn_8O_{16}C$ is about 50% higher than that of $K_xMn_8O_{16}B$, which indicates more sorbents can be loaded and a higher $SO_2$ capacity in a given volume can be achieved.

Although electrolytic manganese dioxide (EMD) from Erachem Comilog, Inc. has $Mn^{4+}$ and a surface area of about 30 $m^2/g$, the $SO_2$ capacity for this material does not approach that of the OMS materials. This indicates that the OMS structure may be important for high $SO_2$ sorption.

$K_xMn_8O_{16}B$ was tested at a temperature of 250° C., 325° C., and 475° C. At 250° C., a lower $SO_2$ sorption rate was observed, but the maximum $SO_2$ capacity was almost the same as that measured at 325° C. and 475° C. In comparing the results at 325° C. and 475 CC, a minimal difference was observed, except that at 475° C., after the breakthrough capacity was reached, the SCD detector background slightly increased, indicating that some $SO_3$ was being released even though total sorption amount was still increasing.

Substantial variation in the feed gas flow rate affected the $SO_2$ sorption performance of $K_xMn_8O_{16}B$ sorbent, although in practice this affect can be mitigated with appropriate sizing and design of the $SO_x$ trap. For example, the $SO_2$ breakthrough capacity decreased about 50% when the feed GHSV increased from 8K to 60K $hr^{-1}$. This indicates the $SO_2$ sorption reaction is mostly controlled by $SO_2$ mass diffusion through the sorbent. Since the $SO_2$ concentration in the feed gas had little or no effect on its sorption suggests that reaction (1) is $0^{th}$ order for $SO_2$, and it is mostly controlled by the available active sites on the sorbent.

Most components in the simulated exhaust combustion gases tested, CO, NO, $CO_2$, and $H_2O$, did not have a significant effect on the $SO_2$ sorption capacity of the $K_xMn_8O_{16}B$ sorbent, and the sorption capacity in an oxygen-free environment, while lower, was still acceptable. Therefore, it is expected that the Mn—OMS materials should be useful to remove $SO_2$ from gas streams in a wide variety of applications.

Example 9

Other OMS Structures $SO_2$ sorption capacities of other manganese oxides with tunnel structures, including Todorokite-type magnesium manganese oxide with channels of 3×3 $MnO_6$ units, sodium manganese oxide with channels of 2×4 $MnO_6$ units, sodium manganese oxide with channels of 2×3 $MnO_6$ units, and pyrolusite manganese oxide with channels of 1×1 $MnO_6$ units, were studied.

Pyrolusite, $MnO_2$ 1×1, was obtained from Stream Chemicals. The as-received chemical was ball-milled for 1 hr to get about 1 μm particles before the $SO_2$ sorption test. One todorokite material, OMS-1, was provided by Engelhard Corporation. Other tunnel-structured manganese oxides were prepared in the lab using the methods described in the published literature.

Birnessite was used as a precursor for the synthesis of channel-structured manganese oxides. Birnessite-type layered manganese oxides were prepared using the methods described in references 5 and 6 below. A typical synthesis included mixing 250 ml 6.4M NaOH solution with 200 ml 0.5M $MnSO_4$ at room temperature. Oxygen was immediately bubbled through a glass frit at a rate of 4 L/min. After 4.5 hours the oxygenation was stopped and the precipitate was filtered out and washed with deionized water 4 times, and then dried in air at 100° C. About 13 g of grey-colored birnessite product was obtained.

Two sodium manganese oxides with channels of 2×3 $MnO_6$ units (Na 2×3 A & B) were prepared by directly calcination of birnessite in air for 12 hours at 500° C., and 650° C., respectively as described in reference 7 below.

Todorokite (magnesium manganese oxide with channels of 3×3 $MnO_6$ units) was prepared as described in references 5 and 8 below. About 3 g birnessite was added to 100 ml 1M $MgCl_2$ solution and the mixture was shaken overnight at room temperature to cause $Mg^{2+}$ ion exchange for $Na^+$. The slurry was washed four times with deionized water. Then, $Mg^{2+}$-birnessite, together with 25 ml $H_2O$, was autoclaved at 150° C. for 48 hours. After washing with DI water 3 times, the product was dried in air at 100° C. About 2.0 g todorokite-type tunnel structure manganese oxide (Mg 3×3) was obtained.

Sodium manganese oxide with channels of 2×4 $MnO_6$ units was prepared using method described in reference 9 below. About 5 g birnessite, together with 25 ml 2.5M NaCl solution, was autoclaved at 210° C. for 48 hours. After washing with DI water 3 times, the product was dried in air at 100° C. About 4.4 g of black-colored product (Na 2×4) was obtained.

The dried materials were sieved to provide 40-80 mesh particles for the $SO_2$ sorption test, which was carried out in a temperature controlled reactor with an SCD analytical system. All of the materials were tested under the same conditions (0.5 gram 40-80 mesh sorbent particles, 100 sccm feed flow of 250 ppm $SO_2$ in 82% $N_2$, 18% $O_2$) at a temperature of 325° C. Additional details are shown in Table 5. Before each $SO_2$ sorption measurement, the sorbent material was heated at 500° C. for 2 hours in flowing air to remove residual moisture. To characterize the structure change before and after $SO_2$ sorption, powder X-ray diffraction pattern (XRD) was collected on some of the tested materials.

TABLE 5

$SO_2$ Sorption Tests of Other OMS Materials

| Sorbent | Test Conditions* |
|---|---|
| $MnO_2$ 1 × 1 pyrolusite from Strem Chemicals, with 1 × 1 tunnels | 0.5 g 40-80 mesh sorbent, 325° C., 100 sccm flow of 250 ppm $SO_2$, 82% $N_2$, 18% $O_2$, GHSV = 18K $hr^{-1}$ |
| Na 2 × 3 A $Na_2Mn_5O_{10}$ with 2 × 3 tunnels, calcined at 500° C. for 12 h | 0.5 g 40-80 mesh sorbent, 325° C., 100 sccm flow of 250 ppm $SO_2$, 82% $N_2$, 18% $O_2$, GHSV = 3.4K $hr^{-1}$ |
| Na 2 × 3 B $Na_2Mn_5O_{10}$, with 2 × 3 tunnels, calcined at 650° C. for 12 h | 0.5 g 40-80 mesh sorbent, 325° C., 100 sccm flow of 250 ppm $SO_2$, 82% $N_2$, 18% $O_2$, GHSV = 5.1K $hr^{-1}$ |
| Na 2 × 3 A | 0.5 g 40-80 mesh sorbent, 325° C., 100 sccm |

TABLE 5-continued

SO₂ Sorption Tests of Other OMS Materials

| Sorbent | Test Conditions* |
| --- | --- |
| Na₂Mn₅O₁₀, with 2 × 3 tunnels, calcined at 500° C. for 12 h | flow of 250 ppm SO₂, 82% N₂, 18% O₂, GHSV = 11K hr⁻¹ |
| Na 2 × 4 sodium manganese oxide with 2 × 4 tunnels | 0.5 g 40-80 mesh sorbent, 325° C., 100 sccm flow of 250 ppm SO₂, 82% N₂, 18% O₂, GHSV = 11K hr⁻¹ |
| OMS-1 todorokite, with 3 × 3 tunnels, provided by Engelhard Corporation | 0.5 g 40-80 mesh sorbent, 325° C., 100 sccm flow of 250 ppm SO₂, 82% N₂, 18% O₂, GHSV = 11K hr⁻¹ |
| Mg 3 × 3 Todorokite, with 3 × 3 tunnels Synthesized | 0.5 g 40-80 mesh sorbent, 325° C., 100 sccm flow of 250 ppm SO₂, 82% N₂, 18% O₂, GHSV = 2.7 hr⁻¹ |

*Before each SO₂ sorption measurement, the sorbent material was heated at 500° C. for 2 hours in 100 sccm air.

Example 10

Other OMS Structures Results and Comparison

The measured breakthrough capacities at selected gas flow rates for the materials prepared in Example 9 are given in Table 6 along with exemplary capacities for the 2×2 structure of Example 1.

TABLE 6

SO₂ Sorption Capacity of OMS Sorbents

| Material tested | GHSV, hr⁻¹ | Break through capacity, wt % |
| --- | --- | --- |
| MnO₂, from Strem Chemicals, 1 × 1 tunnels of MnO₆ units | 18K | <0.1 |
| Na₂Mn₅O₁₀, 2 × 3 tunnels of MnO₆ units, calcined at 500° C. for 12 h (A) | 3.4K | 57.5 |
| Na₂Mn₅O₁₀, 2 × 3 tunnels of MnO₆ units, calcined at 650° C. for 12 h (B) | 5.1K | 31 |
| Na₂Mn₅O₁₀, 2 × 3 tunnels of MnO₆ units, calcined at 500° C. for 12 h (A) | 11K | 12 |
| Sodium Manganese Oxide, 2 × 4 tunnels of MnO₆ units | 11K | 33 |
| MgMn₂O₄ from todorokite (3 × 3) provided by Engelhard Corporation | 11K | 1.5 |
| MgMn₂O₄ from the synthesized todorokite (3 × 3) | 2.7K | 53 |
| Cryptomelane, 2 × 2 tunnels of MnO₆ units | 8K | 62 |
| Cryptomelane, 2 × 2 tunnels of MnO₆ units | 30K | 42 |

Except for two of the materials, the $SO_2$ breakthrough sorption capacities for these materials were generally much higher than those of conventional $SO_x$ sorbents, which typically have $SO_2$ breakthrough sorption capacities less than 5 wt %. This establishes the usefulness of these materials as $SO_x$ sorbents.

The 1×1 $MnO_2$ from Strem Chemicals was confirmed by XRD to be well-crystallized pyrolusite, comprising 1×1 $MnO_6$ tunnels. After calcination at 500° C. for 2 hours in air, the structure remained stable. However, the material exhibited poor sorption capacity, with a breakthrough capacity of about 0.1% and a maximum sorption capacity less than 3%.

The synthesized birnessite was calcined in air either at 500° C. for 12 hours (A) or at 650° C. for 12 hours (B). In both cases, sodium manganese oxide ($Na_2Mn_5O_{10}$) formed, the basic structure consisting of $MnO_6$ octahedra joined at the edges to form a 2×3 tunnel structure. FIG. 8 shows the $SO_2$ sorption performance of both the A and B formulations of this microporous manganese oxide under different GHSV. Similar to the 2×2 cryptomelane materials, this microporous manganese oxide also was found to have a very high $SO_2$ sorption capacity. At 3444 hr⁻¹ GHSV, the total $SO_2$ sorbed was about 70 wt %. At higher GHSV, the $SO_x$ sorption performance decreased, indicating the reaction is controlled by the mass diffusion of $SO_2$ through the sorbent. After $SO_2$ sorption, $MnSO_4$ formed.

Figure 9:
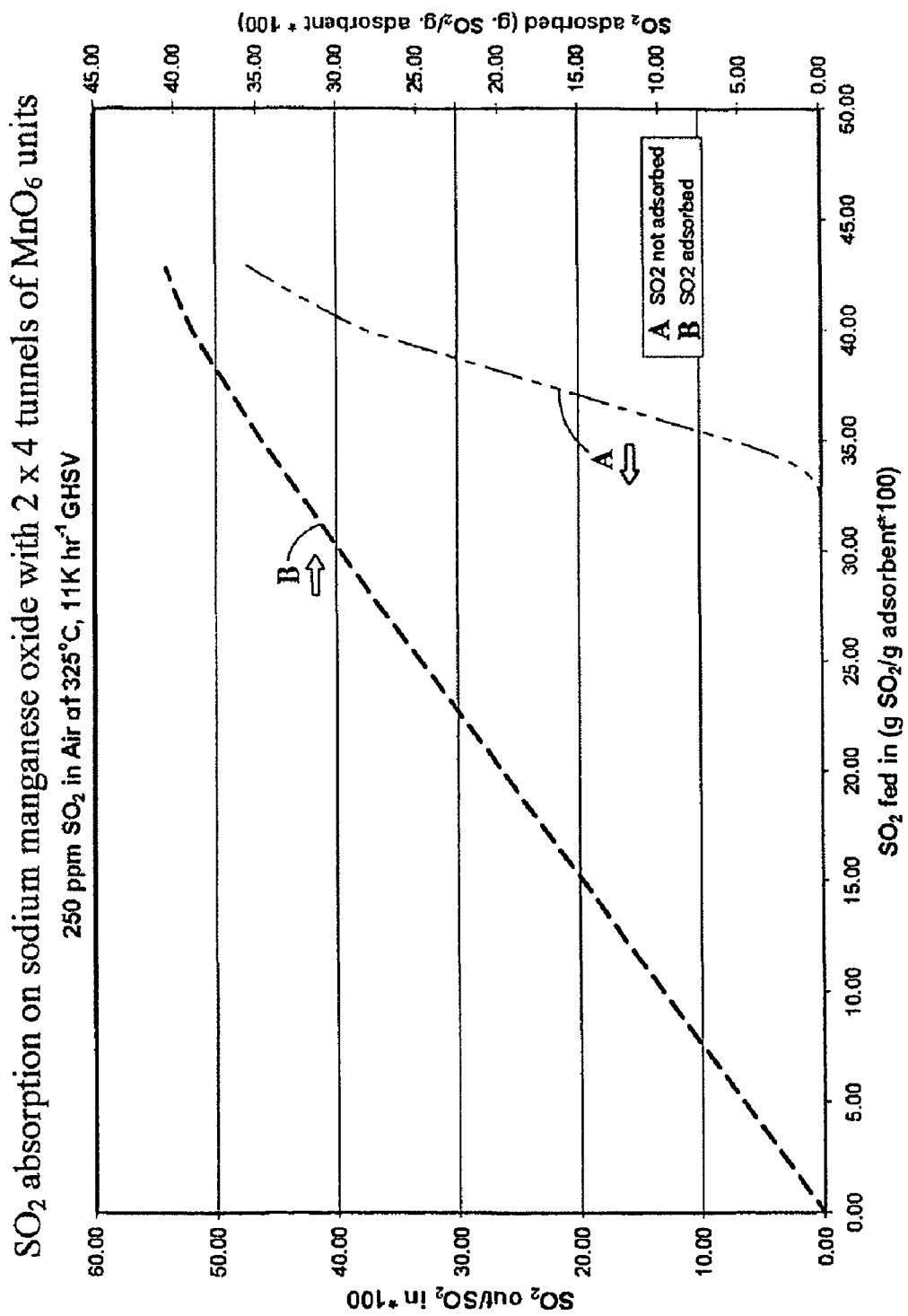
FIG. 9 is a graph showing exemplary plots of the sorption of $SO_2$ on a 2×4 Mn—OMS material.

The XRD pattern of the sodium manganese oxide synthesized by hydrothermal reaction matched very well with the XRD pattern of the sodium manganese oxide material with 2×4 tunnel structure described in reference 10 below. Likewise after calcination at 500° C. for 12 hours in air, the 2×4 tunnel structure remained unchanged. FIG. 9 gives the $SO_2$ sorption test result at 10755 hr⁻¹ GHSV. This material also was found to have a high $SO_2$ sorption capacity.

While the todorokite magnesium manganese oxide prepared by hydrothermal reaction was not well crystallized, the todorokite structure could still be identified in the XRD. However, after calcination at 500° C. for 2 hours in air, the 3×3 tunnel structure changed mostly to $MgMn_2O_4$. This structure change was evident in the $MgMn_2O_4$ provided by Engelhard Corporation as well. While the todorokite materials both exhibited relative high sorption capacities, this instability at moderately high temperatures is a relative disadvantage for most applications. While they could be used as sorbents, most conventional implementations require stability above temperatures of 500° C. or sometimes higher.

Introduction to Examples 10 through 13

The stability of cryptomelane was studied under oxidizing conditions, reducing conditions, and certain lean-rich cycling conditions. Cryptomelane was confirmed to be stable during oxidizing conditions and under lean-rich cycling, but its stability under certain reducing conditions was found to be temperature and condition dependent.

The studies described in Examples 10 through 13 were mostly performed using a Netzsch STA 409 TGA/DSC/MS, where TGA is Thermogravimetric Analysis, DSC is Differential Scanning Calorimetry, and MS is Mass Spectroscopy. Different gases, including air, 2% $H_2$ in Ar and 2% $C_3H_6$ (propylene) in Ar, were used for TGA-DSC analysis. To get a large amount of samples, cryptomelane materials were also treated in a tube furnace with flowing air, 2% $C_3H_6$ in Ar, a simulated rich condition exhaust from a diesel engine, a simulated lean condition exhaust, and a simulated lean-rich cycling exhaust from a diesel engine.

The compositions of the simulated exhausts are displayed in Table 7. Unless otherwise specified, the sorption tests were performed at 325° C., using feed gas of 250 ppm $SO_2$ in air at 8000 $hr^{-1}$ GHSV. Before each sorption test, the sorbent was pretreated in air at 500° C. for 2 hours.

Additional details of these studies can be found in U.S. Provisional Application Ser. No. 60/649,656, filed Feb. 3, 2005, the disclosure of which is hereby incorporated by reference to the extent not inconsistent with the present disclosure.

tomelane was reduced at a temperature as low as 300° C. As the cryptomelane was reduced, it transitioned, at least in part, into $Mn_3O_4$ and MnO. When the cryptomelane was reduced at temperatures higher than 550° C., the $Mn_3O_4$ was further reduced to MnO. Similar results were obtained when the reducing gas comprised 2% $H_2$ in Ar. The doping of Cu and Cr into cryptomelane was not seen to increase its stability under these reducing conditions.

The MnO from reduced cryptomelane was found to be easily re-oxidized when heated in air, but the properties of the

TABLE 7

Composition of Simulated Diesel Engine Exhausts Used in Examples 10 through 13

| Simulated Exhaust | | Carbon Soot | CO | $CO_2$ | $C_3H_6$ | $H_2$ | $H_2O$ | $O_2$ | NO | $N_2$ |
|---|---|---|---|---|---|---|---|---|---|---|
| Rich Condition | | $2 \times 10^{-5}$ g/L | 2000 ppm | 10% | 1000 ppm | — | 10% | 0~1% | 500 ppm | Balance |
| Lean Condition | | $5 \times 10^{-5}$ g/L | 3250 ppm | 7.11% | 360 ppm | — | — | 10.2% | 230 ppm | Balance |
| Lean-Rich Cycling | Lean Cycle | — | — | 10% | — | — | 10% | 12% | 500 ppm | Balance |
| | Rich Cycle | — | 4% | 10% | 4000 ppm | 1.3% | 10% | 1.5% | 500 ppm | Balance |

Example 10

Stability of Cryptomelane Under Oxidizing Conditions

The stability of cryptomelane after two different oxidation pretreatments was tested. The first pretreatment was air containing 10% $H_2O$ for three hours at 600° C. and 30,000 $hr^{-1}$ GHSV. The second pretreatment was the simulated lean exhaust gas (composition listed in Table 7) for one hour at 500° C. Subsequent sorption tests on 250 ppm $SO_x$ in air at 325° C. and 80,000 $hr^{-1}$ GHSV confirmed that the cryptomelane retained its high sorption capacity, and XRD analysis of the cryptomelane after exposure to each oxidizing stream confirmed that the cryptomelane maintained its structural configuration.

Example 11

Stability of Cryptomelane Under Reducing Conditions

As a highly active, high valance manganese oxide, cryptomelane was expected to be somewhat unstable under reducing conditions. DSC analysis of cryptomelane exposed to a reducing stream of 2% $C_3H_6$ in Ar flowing at 40 ml/min while subjected to a heating rate of 10K/min showed that the crypre-oxidized species showed some variation based on the particular reduction-oxidation cycle. For the MnO formed from reduction in 2% $C_3H_6$ in He at 550° C., DSC analysis in 40 ml/min flowing air with a heating rate of 10K/min showed that the MnO was re-oxidized at a temperature as low as 250° C. After oxidation for one hour at 500° C., XRD analysis revealed that most of the cryptomelane crystal structure was recovered.

However, the BET surface area of the cryptomelane decreased from 74 $m^2$/g to 4.9 $m^2$/g, and SEM images demonstrated that the needle-like crystals no longer exited. Subsequent $SO_2$ sorption tests at 325° C. of 250 ppm $SO_2$ in air at 80,000 $hr^{-1}$ GHSV revealed a loss of sorption capacity due to the reduction-oxidation cycle. Post sorption test XRD patterns showed that a large portion of the cryptomelane that had been subjected to this reduction-oxidation cycle remained unused after the $SO_2$ sorption.

As discussed above, at least a portion of the reduced cryptomelane is able to recover its original crystalline structure after it is subjected to re-oxidation. Additional tests were performed to determine phase compositions that were formed after re-oxidation occurred. These tests were performed using the following reducing gases: 2% $H_2$ in He and simulated rich exhaust gas (see Table 7). Table 8 summarizes the phases found after re-oxidation was performed. For all these tests, the most abundant phase formed after re-oxidation was either $Mn_3O_4$ or $Mn_2O_3$, not cryptomelane.

TABLE 8

Phases Formed After Reduction-Oxidation Tests of Cryptomelane

| Reduction condition | Phases after reduction* | Phases after 500° C. 1 hr in air | Phases after 600° C. 1 hr in air |
|---|---|---|---|
| 2% $H_2$ in He, 250° C., 1 hr | $KMn_8O_{16}$ | $KMn_8O_{16}$ | $KMn_8O_{16}$ |
| 2% $H_2$ in He, 300° C., 1 hr | $Mn_3O_4$, MnO, $KMn_8O_{16}$ | $Mn_2O_3$ $KMn_8O_{16}$ ($Mn_3O_4$) | $Mn_2O_3$ $KMn_8O_{16}$ ($Mn_3O_4$) |
| 2% $H_2$ in He, 350° C., 1 hr | MnO, ($Mn_3O_4$) | $Mn_3O_4$ ($KMn_8O_{16}$ MnO) | $Mn_2O_3$ $KMn_8O_{16}$ ($Mn_3O_4$) |
| 2% $H_2$ in He, | MnO | $Mn_3O_4$ (MnO | $Mn_2O_3$ $KMn_8O_{16}$ |

TABLE 8-continued

Phases Formed After Reduction-Oxidation Tests of Cryptomelane

| Reduction condition | Phases after reduction* | Phases after 500° C. 1 hr in air | Phases after 600° C. 1 hr in air |
|---|---|---|---|
| 550° C., 1 hr Rich exhaust (table 7), 550° C. 1 hr | $Mn_3O_4$ $K_2Mn_4O_8$ (MnO) | $KMn_8O_{16}$) $Mn_3O_4$ $KMn_8O_{16}$ (MnO) | ($Mn_3O_4$) $Mn_2O_3$ $KMn_8O_{16}$ ($Mn_3O_4$) |

*Major phase listed first, minor phase listed in parentheses.
Rich exhaust composition given in Table 7.

The properties of the reduction-oxidation treated cryptomelane were seen to change significantly. The rich-exhaust treated cryptomelane (550° C. for one hour) was found to have a significantly reduced surface area (5.1 m²/g) and $SO_2$ sorption capacity.

Example 12

Stability of Cryptomelane Under Lean-Rich Cycling

An analysis of the results discussed in Examples 10 and 11 show that whether or not cryptomelane can recover its original crystal structure and its original $SO_2$ sorption performance after a reduction-oxidation cycle largely depends on the composition of the reductant and the cryptomelane treatment history. In an effort to study the effect of lean-rich cycling ($NO_x$ trap approach) on cryptomelane, cryptomelane was subjected to lean-rich cycles at 475° C. for 6.5 hours (cycling at 360 seconds lean and 30 seconds rich). The exhaust gas flow was 26,000 hr$^{-1}$ GHSV and its composition was the same as is listed in Table 7.

XRD patterns of cryptomelane taken both before and after the treatment cycle were almost identical. Some morphology changes were observed under SEM, and cryptomelane's BET surface area decreased from 74 m²/g to 20 m²/g after treatment. However, the $SO_2$ sorption performance of the lean-rich treated cryptomelane was very close to that of fresh cryptomelane. Additionally, as revealed from the XRD pattern of lean-rich cycled cryptomelane loaded with $SO_2$, a substantial amount of the cryptomelane was used for $SO_2$ sorption.

The DSC analysis above indicated that cryptomelane can be re-oxidized at a lower temperature (e.g., 250° C.) than the temperature at which it can be reduced (e.g., 300° C.).

Since the lean-rich cycling was performed at a constant temperature of 475° C., any cryptomelate that was reduced during the rich conditions was re-oxidized during the lean condition with the end result being that the cryptomelane structure remained unchanged. Moreover, the fact that the re-oxidation temperature is below the reduction temperature of cryptomelane provides ample flexibility in selecting the operating temperature (or temperature range) for lean-rich cycling such that any cryptomelate that is reduced during the rich conditions can be re-oxidized during the lean condition.

Example 13

Stability of $SO_2$-Loaded Cryptomelane

After $SO_2$ sorption occurs on cryptomelane, $MnSO_4$ and $K_2Mn_2(SO_4)_3$ form. As determined by TGA, these compounds are very stable in an oxidizing atmosphere. The stability of the $SO_2$-sorbed cryptomelane was studied using TGA-MS analysis on $SO_2$-loaded cryptomelane. From a sulfur stabilization point of view, the used cryptomelane was stable at temperature up to approximately 600° C. in 2% $H_2$ in He. At temperatures above 600° C. $SO_2$ and $H_2S$ were released from the cryptomelane. At approximately 200° C., some $H_2O$ was released from the sorbent. Similar results were also observed when Cu-doped and Cr-doped $SO_2$-sorbed cryptomelane was studied. Doping Cu or Cr into cryptomelane did not affect the stability of the $SO_2$-loaded sorbent.

Stability of the used sorbent under a rich stimulant was studied by continuously passing 2% CO and 2000 ppm $C_3H_6$ (balanced in Ar) through the used sorbent at 70,000 hr$^{-1}$ GHSV. Table 9 shows the sulfur concentration in the off gas at different temperatures. At temperatures below about 450° C., the used sorbent was stable in rich exhaust gas, as only a small amount of sulfur was released from the sorbent. At approximately 500° C., the used sorbent was relatively unstable and a larger amount of sulfur (100 ppm) was released from the sorbent. After 20 hours of reduction, it was found, using XRD analysis, that $MnSO_4$ had been reduced to MnO and MnS. $K_2Mn_2(SO_4)_3$ appeared to remain stable under this extreme condition. When exposed again to air at 500° C., the MnO and MnS were oxidized back to $Mn_3O_4$ and $MnSO_4$. At the same time, some $SO_x$ was released from the sorbent.

TABLE 9

Sulfur Concentration in Off Gas from Used $KMn_8O_{16}$ ($MnSO_4$) Reduced in 2% CO/2000 ppm $C_3H_6$ at 70K$^{-1}$ GHSV

| | Temperature, ° C. | | | | |
|---|---|---|---|---|---|
| | 20 | 150 | 200 | 250 | 300 |
| [S] out, ppm | <100 ppb | <100 ppb | <100 ppb | <100 ppb | <100 ppb |

| | Temperature, ° C. | | | |
|---|---|---|---|---|
| | 350 | 400 | 450 | 500 |
| [S] out, ppm | 300 ppb | 1.8 ppm | 10 ppm | ~100 ppm |

Discussion of Examples 10 through 13

Cryptomelane, a high capacity $SO_x$ sorbent, was shown to be stable under oxidizing conditions and, in general, to be easily re-oxidized after reduction. However, when subjected to reducing conditions for extended periods, the $SO_2$ capacity upon re-oxidation can be significantly less than that for fresh cryptomelane. However, for the type of lean-rich cycling proposed for $NO_x$ trap regeneration, cryptomelane showed no noticeable change in its crystal structure or in its $SO_2$ sorption capacity. Further, after $SO_2$ sorption, the used cryptomelane was shown to be stable and avoided releasing any significant amount of sulfur up to moderate temperatures.

Example 14

Silver Hollandite Synthesis and Characterization

Ag-hollandite was synthesized using post-ion exchange treatment of cryptomelane in $AgNO_3$ solution, followed by calcination in air. The cryptomelane was prepared using the method described in reference 3 below. A typical post-ion exchange treatment of cryptomelane (denoted as method A) included adding 1.0 g of cryptomelane to 100 mL 1M $AgNO_3$ solution, putting the mixture into a temperature-controlled shaker and heating to 55° C. under continuous shaking. The total ion exchange duration was 24 hrs. The liquid was decanted, and the solid was dried in air at 120° C. overnight. The dried powder was calcined in air at 500° C. for 2 hours. The yield was 1.3 g.

A second method (denoted as method B) to synthesize silver hollandite from cryptomelane involved performing the ion exchange in a melt of the silver salt, rather than in solution. More specifically 2.0 g of cryptomelane were added to 20 mL of 1M $AgNO_3$ solution, the mixture was put into a temperature-controlled furnace and heated to 150° C. for 3 hours, and then to 250° C. for 12 hours. After the ion exchange treatment, the extra $AgNO_3$ in the mixture was washed off using deionized water. The yield of dried powder was 2.54 g. Table 10 displays some sample compositions that were synthesized in this study.

TABLE 10

Cation Molar Composition of Cryptomelane and Ag-Hollandite from ICP Analysis

| Sample | K % | Ag % | Mn % |
|---|---|---|---|
| Cryptomelane | 7.25 | 0 | 92.75 |
| Ag-hollandite A | 3.95 | 21.38 | 74.67 |
| Water-washed Ag-hollandite A | 3.72 | 19.01 | 77.26 |
| Acid-washed Ag-hollandite A | 3.03 | 8.07 | 88.89 |
| Ag-hollandite B | 1.52 | 21.22 | 77.26 |

Powder X-ray diffraction (XRD) patterns were collected with a Sintag IV diffractometer using Cu Kα radiation. Transmission electron microscope (TEM) with electron dispersion spectrum (EDS) pattern, BET surface area, ICP elemental analysis, TPR analysis, TGA-DSC, and XPS spectra were also collected on some of the tested samples. For ICP elemental analysis, about 20 mg of solid powder was dissolved in a solution of 12 ml of 2% $HNO_3$-30% $H_2O_2$ in water. The mixture was then diluted 1000 times with 2% $HNO_3$ before ICP chemical analysis. XPS measurements were performed using a Physical Electronics Quantum 2000 Scanning ESCA Microprobe.

$SO_2$ Uptake and CO, Hydrocarbon (as $C_3H_6$), and NO Oxidation Measurements The test setup included a small, fixed bed quartz tube reactor, which was heated by a small clam-shell furnace. Reactant gases were metered using mass flow controllers. In different runs, different feed gases were utilized. The $SO_2$ analytical system comprised a HP6890 gas chromatograph equipped with a Sulfur Chemiluminescent Detector (SCD). The analytical system used was the same as that described above. The concentration of CO, $C_3H_6$, and $CO_2$ were measured using an Agilent Quad Series Micro GC. The NO, $NO_2$ and total $NO_x$ were measured using a 600-HCLD Digital $NO_x$ Meter (California Analytical Instruments, Inc.). During the experimental runs, the analytical system was operated continuously, sampling the effluent every three minutes. The maximum sensitivity of the system to $SO_2$ (with $SO_2$ feed levels at 10 ppm) was approximately 50 ppb, and to CO, $CO_2$, $C_3H_6$, NO, $NO_2$ was approximately 5 ppm. Typical measurements employed a 0.2 g sample, pressed and sieved to 40-80 mesh. Each sample was pretreated in flowing air (100 sccm) at 500° C. for two hours prior to measuring $SO_2$ uptake and oxidation performance.

Results and Discussion

The structure of silver hollandite is different than that of traditional hollandite in that the silver cations do not occupy the centers of the cubic cages formed by $MnO_6$ octahedra, but rather the common faces of the cubes, coordinated with four oxygen anions at about 0.24 nm. This special structure, as well as the special property of Ag cations and Ag—Mn mixtures, may contribute to some unique catalytic and ion conductive properties.

The $Ag^+$ cation can be doped into the tunnel structure of cryptomelane by post ion-exchange. Actually, cryptomelane can be effective for selective sorption of $Ag^+$ at a low pH range, even in the presence of large amount of other cations. After the $Ag^+$ ion exchange, the original cryptomelane crystal structure disappears, and a crystallized Ag-hollandite forms.

Figure 13:
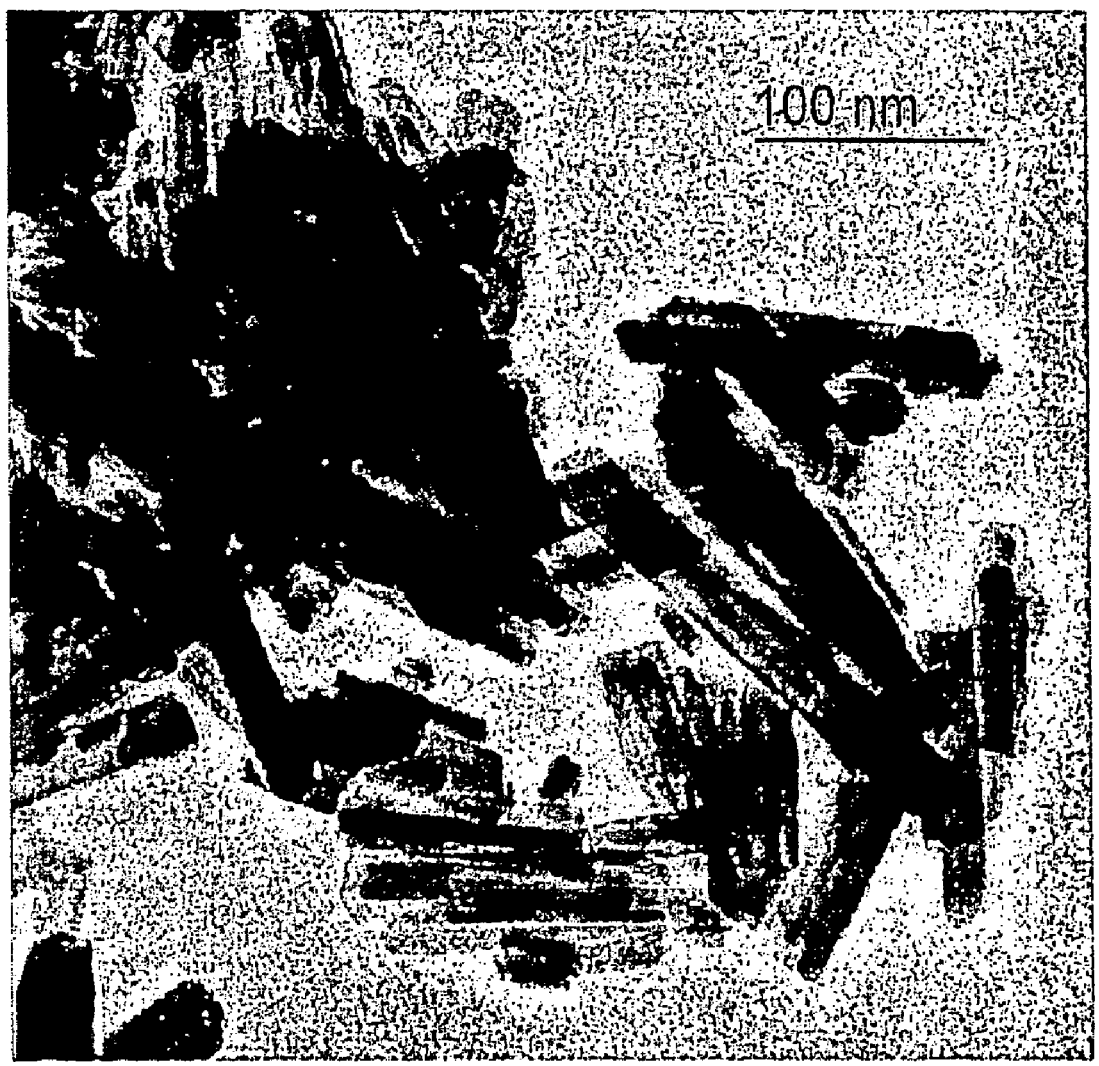
FIG. 13 is an exemplary TEM image of Ag-hollandite from synthesis method A.
Figure 14:
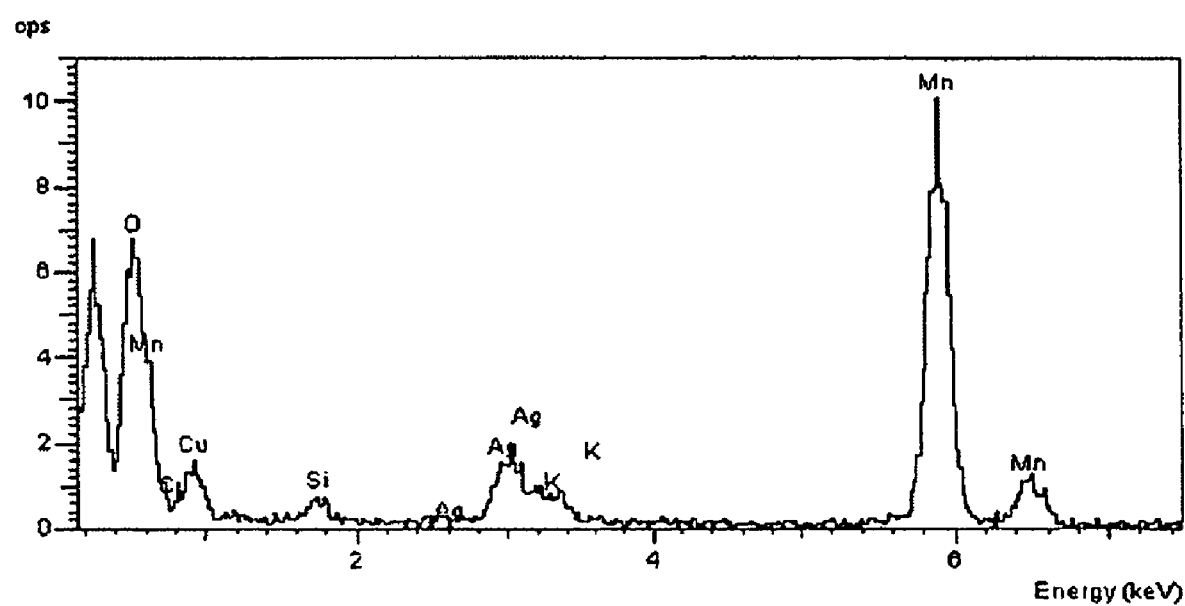
FIG. 14 is an exemplary selected area electron diffraction pattern of Ag-hollandite from synthesis method A.
Figure 15:
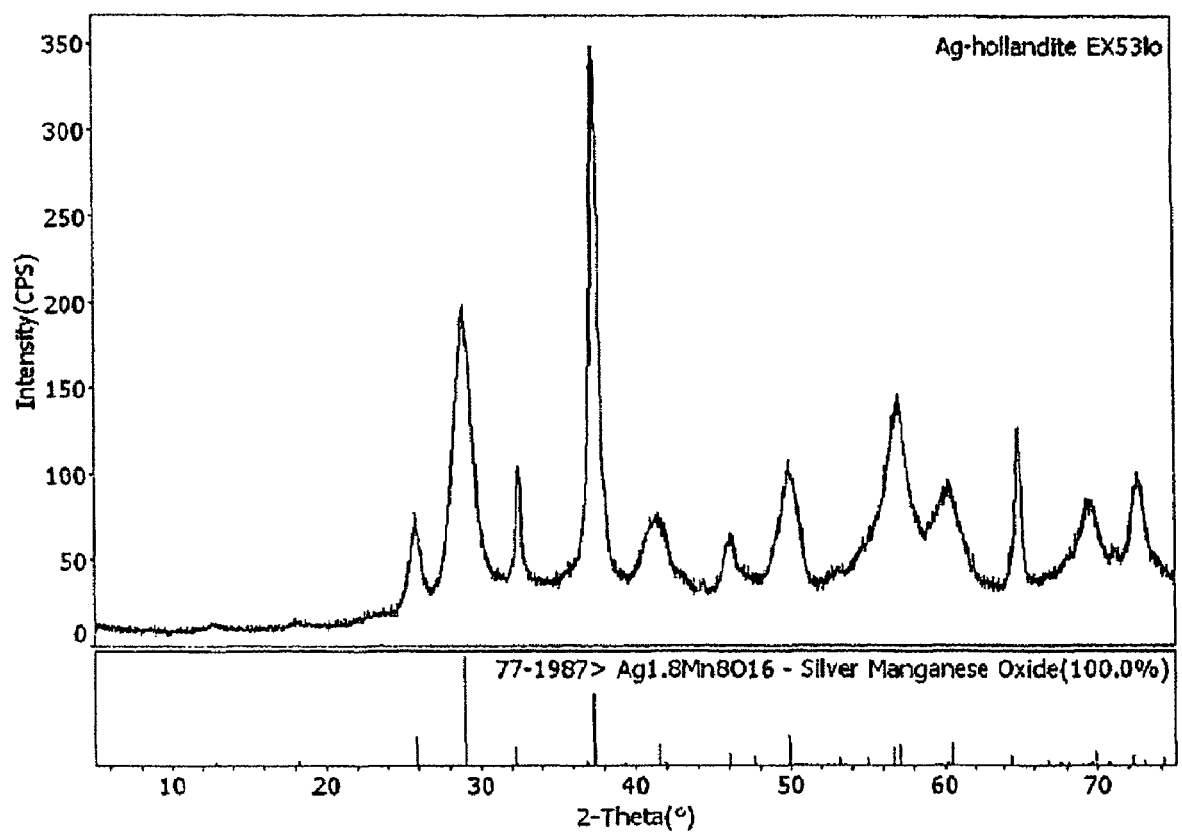
FIG. 15 is an exemplary x-ray diffraction pattern of Ag-hollandite from synthesis method B.

Highly crystallized Ag-hollandite was obtained using synthesis method A (Ag-hollandite A) as described above, i.e., by ion exchanging at 55° C. and calcining without intermediate wash of the product with DI water. FIGS. 13-15 show the resulting XRD pattern, TEM image and selected area electron dispersion spectrum, respectively. The cation composition is given in Table 10.

Figure 12:
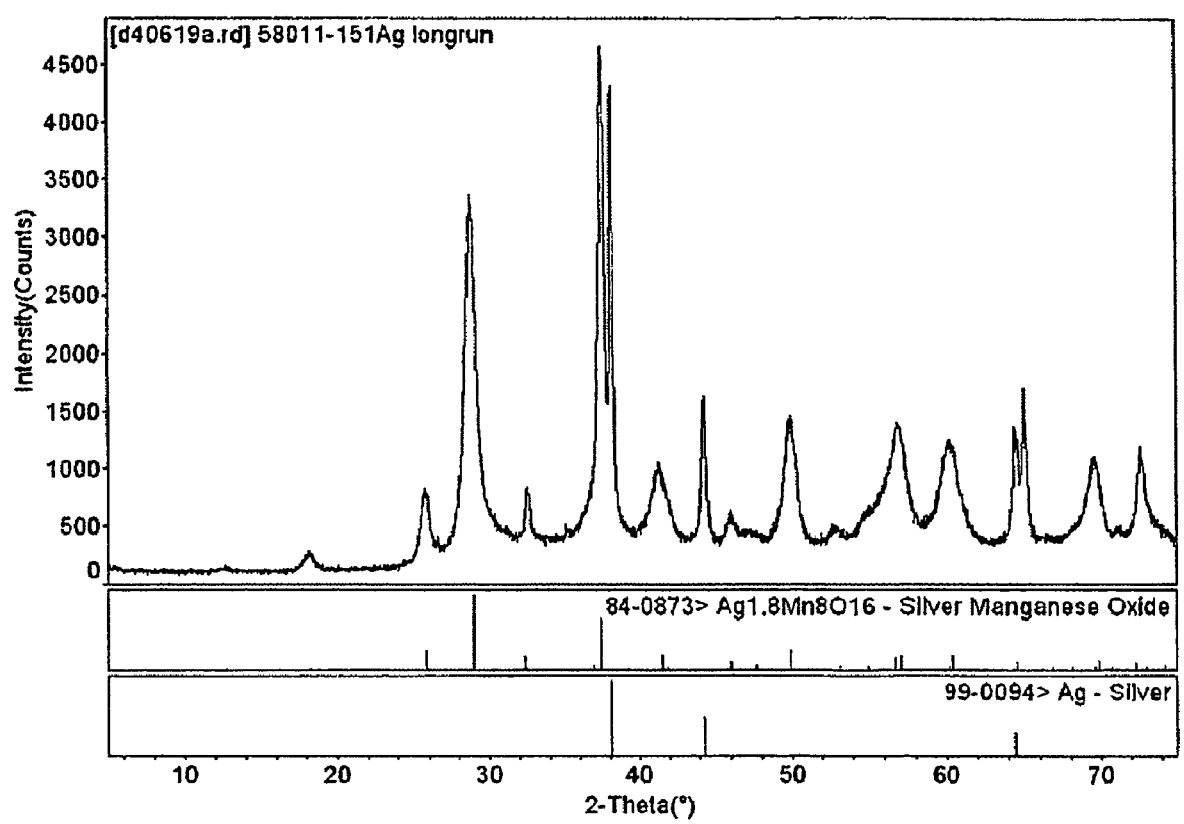
FIG. 12 is an exemplary x-ray diffraction pattern of Ag-hollandite from synthesis method A.

The XRD pattern (FIG. 12) matched well with that of Ag-hollandite, $Ag_{1.8}Mn_8O_{16}$. Certain amounts of metallic silver also existed in the final product. Because there was no product washing before final calcination, it is believed that this metallic silver came from the decomposition of the extra $AgNO_3$. These silver particles were so big that they were visible to the naked eye. The crystal size of Ag-hollandite A was small. The crystals were needle-like, being approximately 30 nm in width and 100-200 nm in length. This morphology is quite similar to that of the cryptomelane, except that the Ag-hollandite crystals were relatively shorter.

The EDS pattern and ICP analysis both show evidence of a small amount of $K^+$ in the crystal structure, which indicated that the ion exchange process was not substantially complete. This also suggests that the Ag-hollandite crystal structure was able to accommodate a small amount of $K^+$.

Chemical analysis of a water-washed sample of Ag-hollandite A with large silver particles manually picked out indicated that the K+ ions were potentially located inside the hollandite structure. The BET surface area of the as-synthesized material (Ag-Hollandite A) was 35 m²/g, which can be mostly attributed to the small particle size.

In an attempt to remove the extra metallic silver, the Ag-hollandite A final product was treated with a 2M $HNO_3$ solution. It was found, using XRD pattern analysis, that the silver phase could be removed, but that extra hollandite structure also resulted. Additionally, ICP results showed that the amount of silver in the sample was less than that in Ag-hollandite A. This indicated that the $Ag^+$ cations inside the tunnel structure of Ag-hollandite could be easily removed and replaced by H+ cations, and that the use of an acid wash to purify the Ag-Hollandite A was not advantageous.

In another attempt to remove the extra silver phase, the ion-exchanged cryptomelane was washed with DI water before the final calcinations occurred. Although the silver phase was removed in the final product, excess hollandite structure showed up again. The XRD pattern of this sample was similar to that of the intermediate product for Ag-hollandite A, i.e., cryptomelane ion exchanged in 1M $AgNO_3$ at 55° C., washed off extra $AgNO_3$ with DI water, and dried at 120° C. in air with no calcination at 500° C.

Because no other cations were available for ion exchange with $Ag^+$ during washing with DI water, those $Ag^+$ cations already exchanged with the $K^+$ cations likely remained in their original structure. This also suggests that the final calcination step did not change the structure when no additional $AgNO_3$ was available. In other words, the difference in the final product structure and cation composition between the intermediated washed sample and the non-washed sample likely came from changes during the calcination step. Thus, to get highly crystallized Ag-hollandite in the Ag-Hollandite A synthesis method, the calcination would appear to benefit from being carried out without washing off the extra $AgNO_3$.

In the Ag-Hollandite A synthesis method, the final calcination step involved heating in air from 25 to 500° C. at a rate of 10° C./min, and then maintaining at 500° C. for 2 hours. Under this condition, the extra $AgNO_3$ melted first (at approximately 212° C.) and then decomposed (at approximately 444° C.). It was postulated that most of the ion exchange reaction between $Ag^+$ and $K^+$ occurred between 212° C. and 444° C. in the $AgNO_3$ melt, rather than during the calcination at 500° C. The Ag-hollandite synthesis method B was developed to test the theory that significant ion exchange occurs in the silver salt melt.

Figure 16:
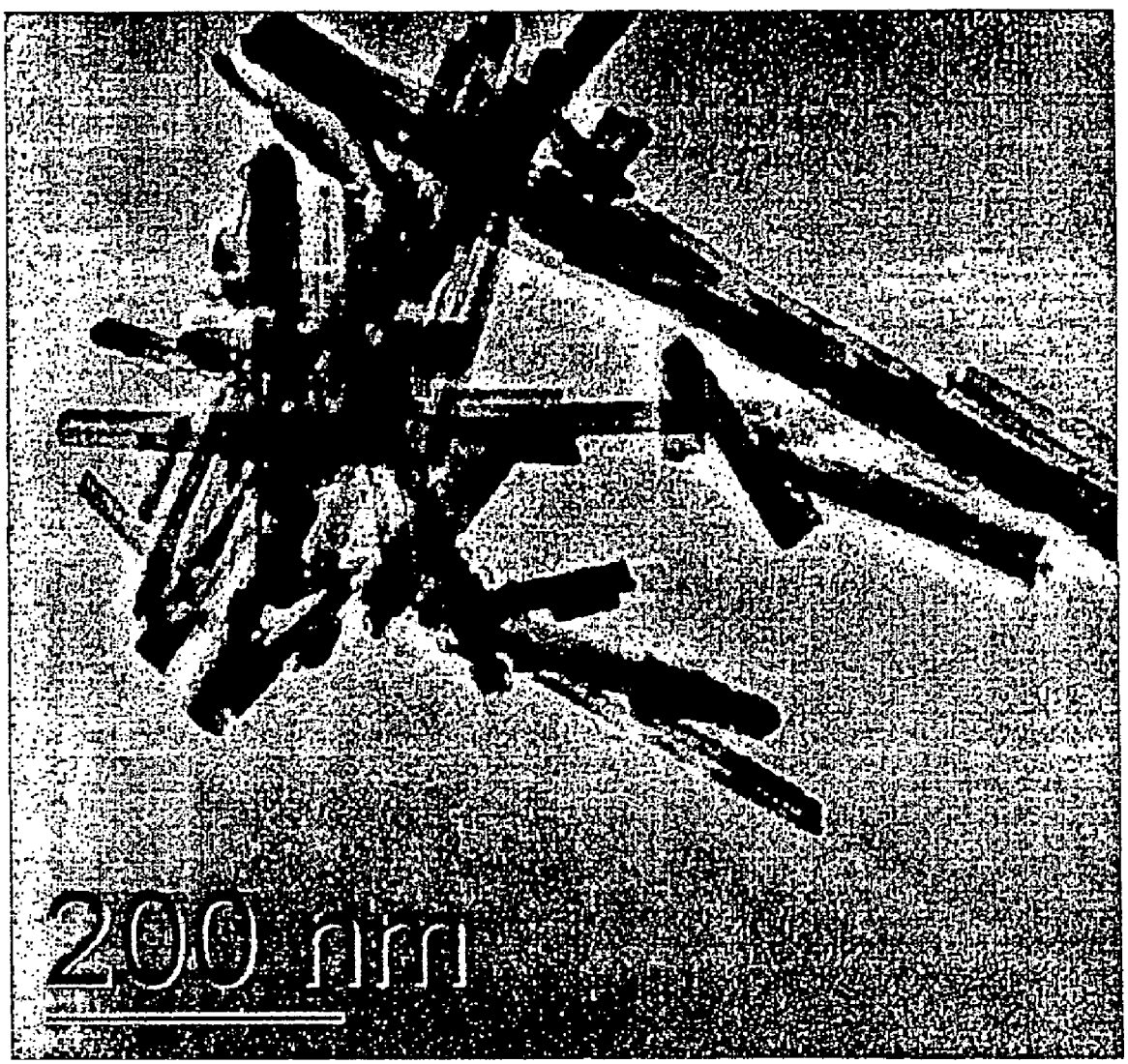
FIG. 16 is a first exemplary TEM image of Ag-hollandite from synthesis method B.
Figure 17:
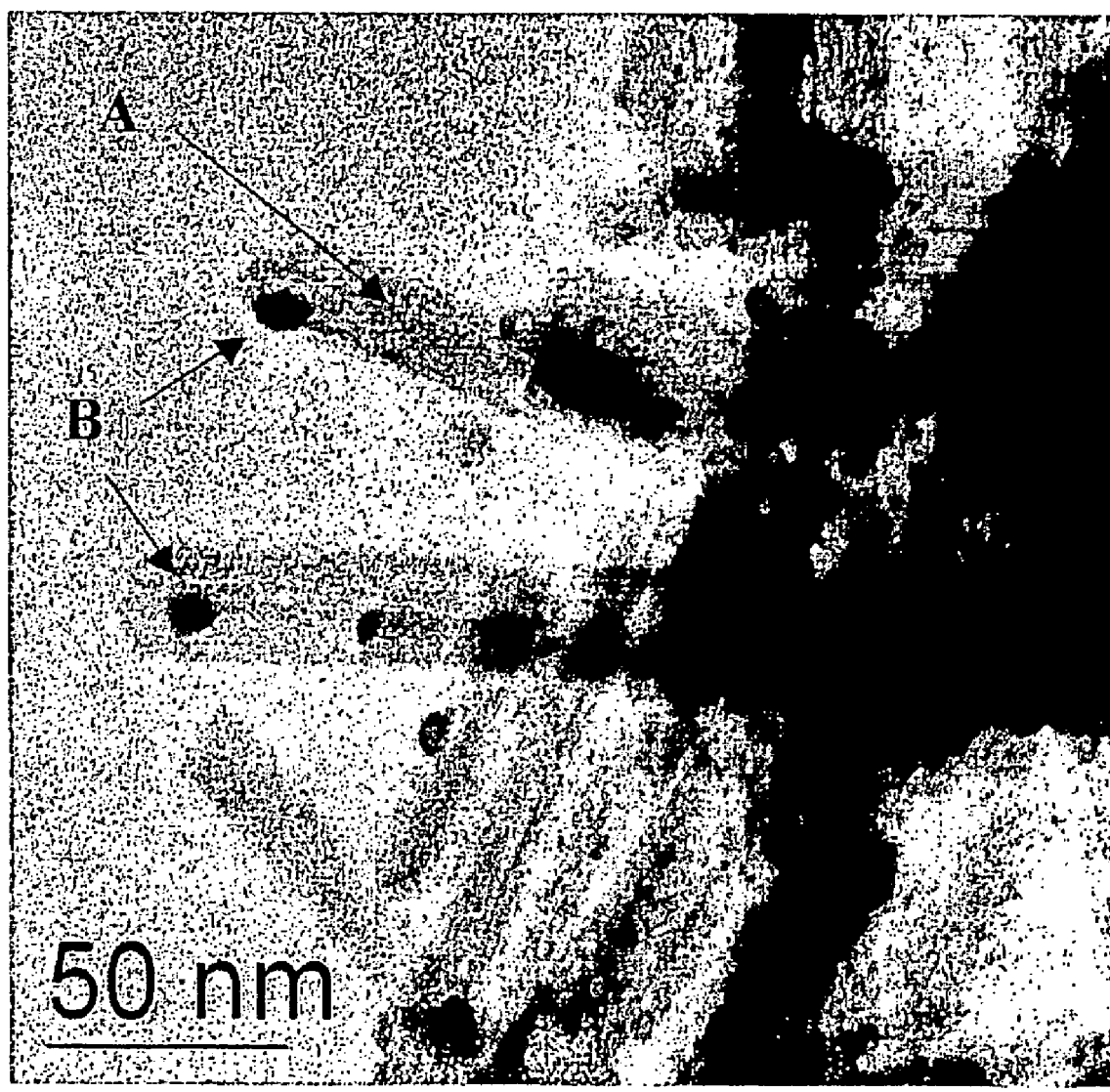
FIG. 17 is a second exemplary TEM image of Ag-hollandite from synthesis method B.
Figure 18:
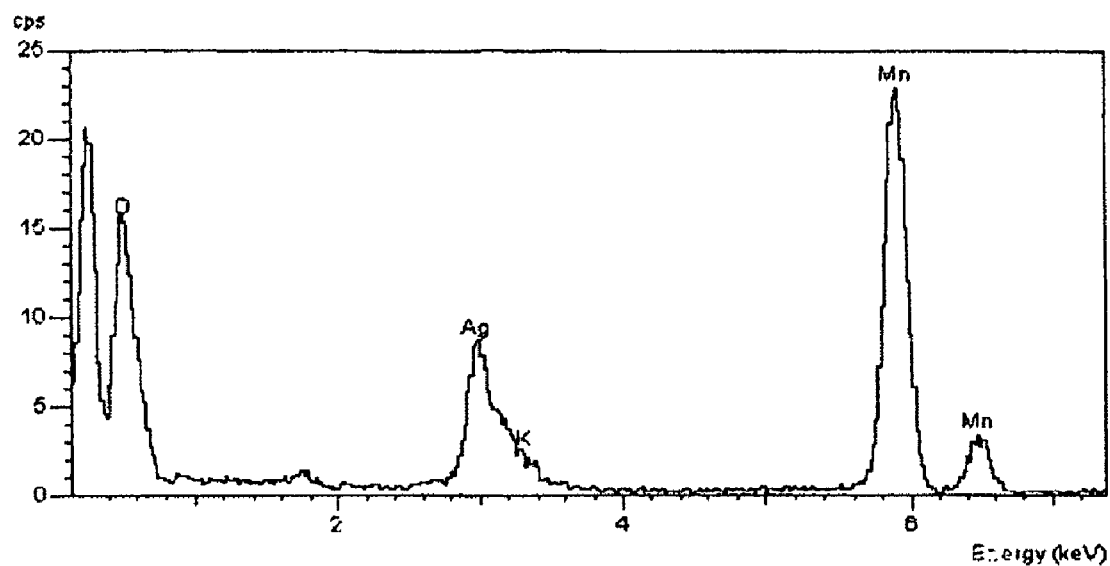
FIG. 18 is an EDS of spot A in FIG. 17.
Figure 19:
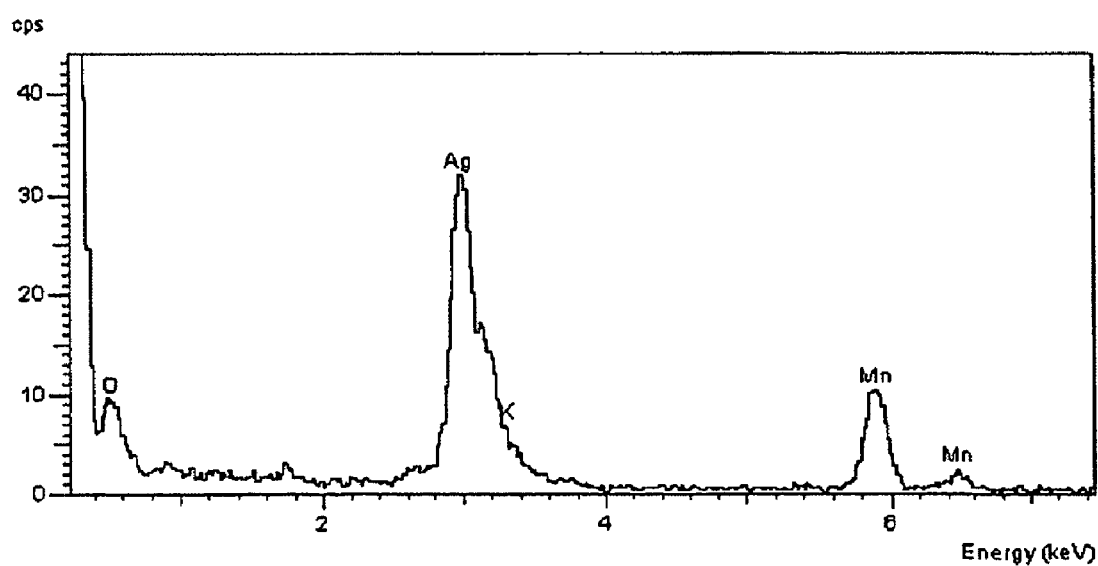
FIG. 19 is an EDS of spot B in FIG. 17.

FIG. 15 shows the XRD pattern of the Ag-hollandite formed via method B, and FIGS. 16 and 17 show selected TEM images. In the TEM images (FIGS. 16 and 17), small silver particles (indicated as spot B) are evident coated on the Ag-hollandite surface (spot A). The EDS spectrums of spots A and B are given in FIGS. 18 and 19 respectively.

The EDS signal for Ag from spot A (Ag-hollandite crystal without Ag metal) is smaller than that for Mn, whereas in the EDS signal for spot B, the Ag signal is much larger than that for Mn. This indicates that even in method B, there are still some Ag particles on the Ag-hollandite surface. Note that the signal ratio of Ag/Mn in spot A (Ag-hollandite crystal from method B without Ag metal) is larger than that in FIG. 14 (Ag-hollandite from method A). This indicates the Ag concentration in the method B synthesized Ag-hollandite is much higher than that in the previous sample (method A). The composition of Ag-Hollandite B is given in Table 10.

Compared to the Ag-hollandite from method A, the Ag-hollandite B has several special properties. For example, in the XRD patterns for Ag-Hollandite A (FIG. 12) a silver peak is present, but no such peak is observed in the XRD pattern for Ag-hollandite B (FIG. 15). Additionally, the crystal size of Ag-hollandite B is slightly larger than that from method A, and was almost the same as that of the starting material, cryptomelane. Further, some small silver particles (<5 nm diameter) were found coated on the Ag-hollandite B surface, which was not seen on the previous Ag-hollandite sample. Finally, in Ag-hollandite B, the $K^+$ concentration decreased, and the $Ag^+$ concentration increased.

Generally, the Ag-Hollandite B synthesis method yielded more pure Ag-hollandite products, and the ion-exchange between silver and potassium cations was substantially completed. The small silver particles may have resulted from the decomposition of a small amount of $AgNO_3$ at 250° C. during the ion exchange synthesis process. The small particle size of Ag-hollandite A may be the result of $AgNO_3$ decomposition, i.e., the $NO_x$ gas may cut the long crystal into small pieces.

Like cryptomelane, Ag-hollandite is quite stable under oxidation conditions. When heated in air, for example its structure remains unchanged up to about 700° C. However, under reducing conditions, its reactivity is somewhat enhanced. The reactivity of cryptomelane and Ag-hollandite A and B were studied in 10% $H_2$ in Ar using TPR analysis. As found, $H_2$ reacted with Ag-hollandite A and B at temperatures as low as 100° C., whereas cryptomelane required temperatures higher than 250° C. to react with $H_2$. This unique Ag-hollandite property has use in the low temperature oxidation of some reductants.

Like the cryptomelane discussed above, silver hollandite was also found to be a good high-capacity $SO_x$ sorbent, particularly so at lower temperatures. Table 11 shows the low temperature $SO_2$ sorption performance of Ag-hollandite. When compared to cryptomelane, Ag-hollandite shows much higher $SO_2$ capacity at low temperatures. Ag-hollandite from method B has a $SO_2$ capacity of about 8.75 wt % at 150° C., and 26.8 wt % at about 200° C. Ag-hollandite from method A also shows a higher low-temperature $SO_2$ capacity (28 wt % at about 250° C.) than cryptomelane. The low temperature $SO_2$ capacity strongly depends on how much Ag-hollandite is present in the sorbent. As pointed out above, in synthesis method A, if extra $AgNO_3$ is washed off before final calcination, (i.e., no ion exchange occurs in the silver salt melt) only a small amount of Ag-hollandite is formed. As a result, this sorbent shows a low $SO_2$ capacity at low temperatures.

For comparison, several other sorbents, including $Ca(OH)_2$ (from Aldrich), $Ca(OH)_2$ (from thermal decomposition of $Ca(OH)_2$ at 600° C. 12 hours), and a $ZrO_2$—$CeO_2$—$La_2O_3$ (62, 29, 9 wt %) mixture (from Daiichi Kigenso Kagaku Kogyo Co., Ltd.) were also tested and their $SO_2$ capacities are given in Table 11. Previous work has shown that these materials show relatively high $SO_2$ capacity at 325° C.

TABLE 11

$SO_2$ Breakthrough Capacity of Ag-Hollandites and Other Sorbents

| Sorbent | 150° C. | 200° C. | 250° C. | 325° C. |
| --- | --- | --- | --- | --- |
| Cryptomelane | 1.54 | 1.60 | 2.90 | 63.85 |
| Ag-hollandite B | 8.75 | 26.84 | 33.42 | 42.5 |
| Ag-hollandite A | 2.20 | 5.20 | 38.1 | 43.3 (36$^x$) |
| Acid-washed Ag-hollandite A | 1.71 | 1.71 | 4.12 | |
| CaO | 4.25 | 10.65 | 20.70 | |
| $Ca(OH)_2$ | 1.60 | 4.07 | 7.52 | |
| Ce—Zr—La#14 | 2.22 | 2.22 | 2.22 | |

Feed: 10 ppm $SO_2$ in air unless specified, GHSV: 60K hr$^{-1}$
Breakthrough capacity (100 × (g $SO_2$)/(g sorbent)): defined as the point where $SO_2$ out exceeded 100 ppb.
$^x$Feed gas: 10 ppm $SO_2$, 230 ppm NO, 500 ppm CO, 378 ppm $C_3H_6$, 15% $O_2$, balanced in $N_2$, GHSV: 60K hr$^{-1}$.

Figure 20:
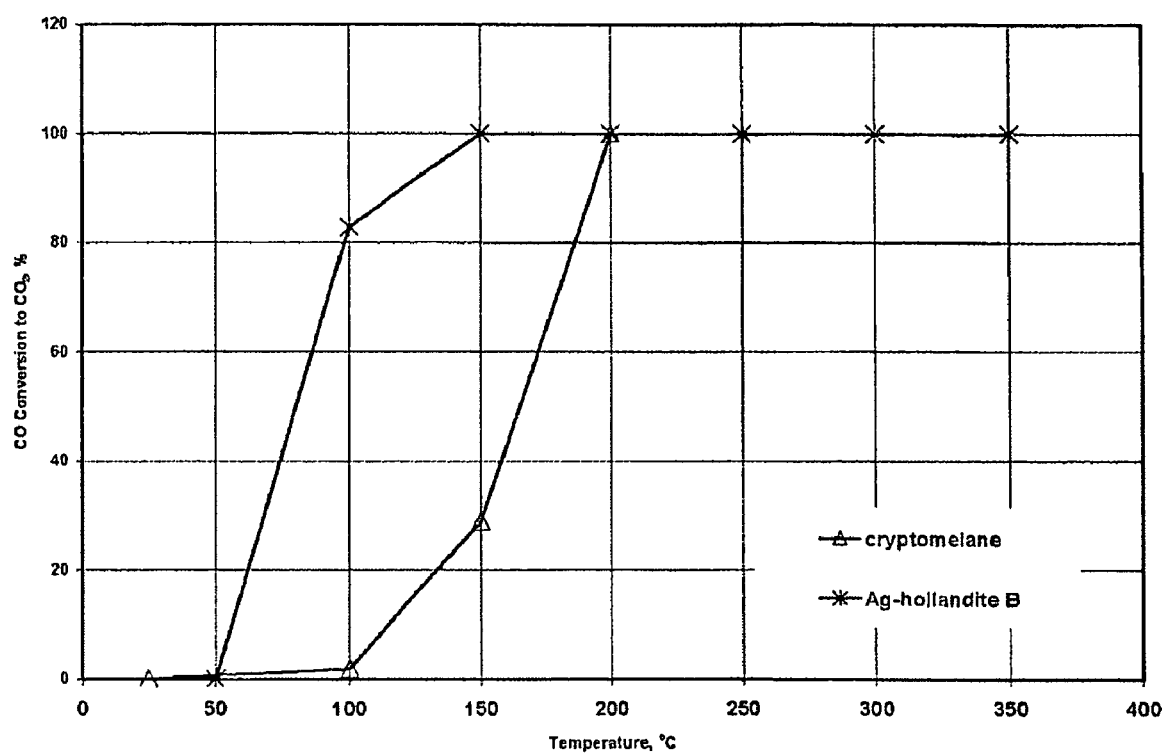
FIG. 20 is a graph showing exemplary plots of the CO oxidation properties of Ag-hollandite from synthesis method B and cryptomelane over a range of temperatures.
Figure 21:
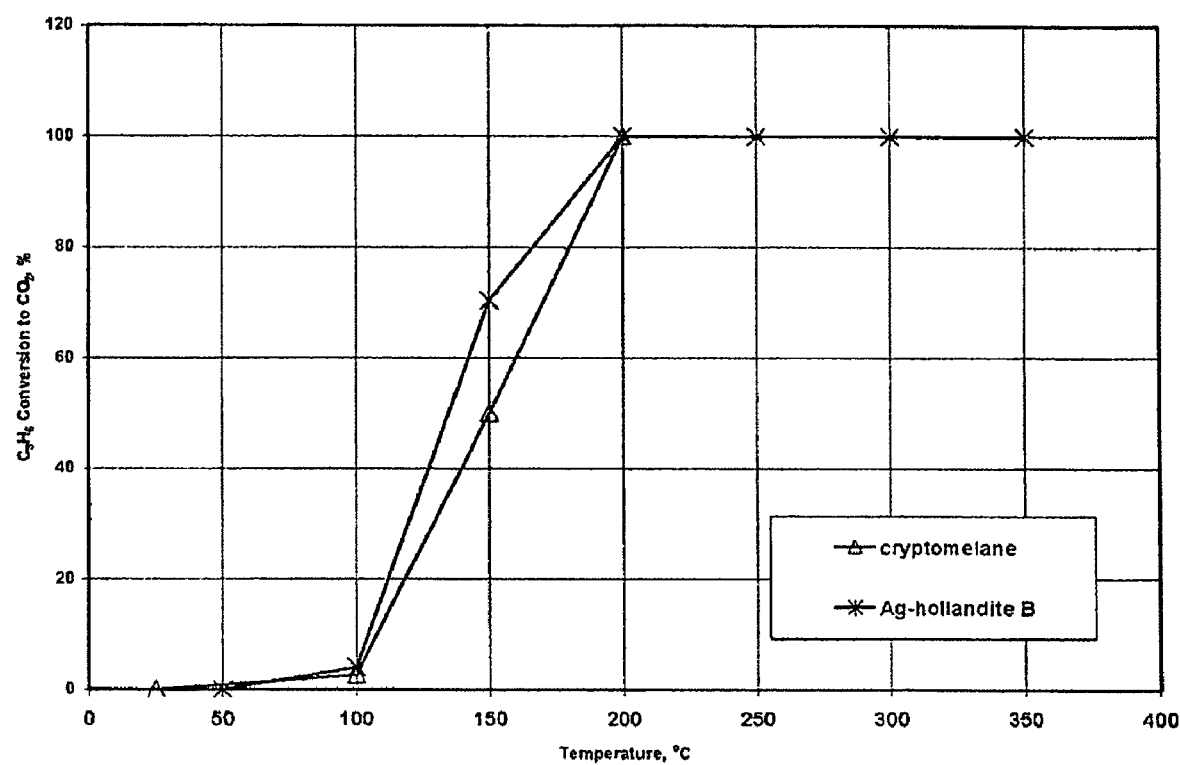
FIG. 21 is a graph showing exemplary plots of the $C_3H_6$ oxidation properties of Ag-hollandite from synthesis method B and cryptomelane over a range of temperatures.

The CO oxidation and $C_3H_6$ oxidation properties of Ag-hollandite and cryptomelane were compared over various temperatures, and the results plotted in FIGS. 20-21. At higher temperatures (i.e. above about 200), the conversions were similar, but for Ag-hollandite, the plots show significantly higher conversion at lower temperatures. For example, at 100° C., Ag-hollandite B can oxidize more than 80% of CO to $CO_2$, versus less than 2% for cryptomelane. At 150° C., Ag-hollandite B can oxidize 70% of the $C_3H_6$ present to $CO_2$, versus about 50% for cryptomelane. Ag-hollandite was also seen to have a greater low-temperature sulfur tolerance relative to cryptomelane, which is reasonable because Ag-hollandite is a better low-temperature sulfur sorbent. With 8 ppm $SO_2$ in the feed, CO conversion over cryptomelane at 200° C.

decreases from 100% to 60% over 15 hours, whereas, the corresponding conversion over Ag-hollandite B at 150° C. remains unchanged (CO conversion stays at 100%).

Figure 22:
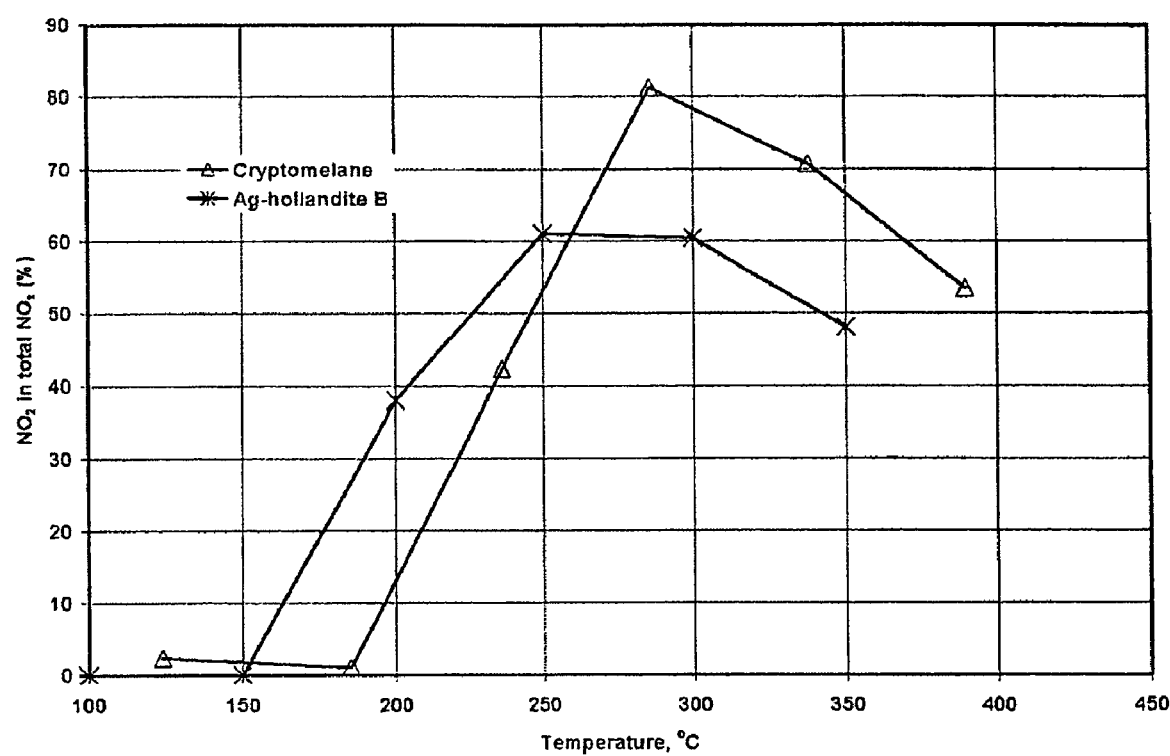
FIG. 22 is a graph showing exemplary plots of the NO oxidation properties of Ag-hollandite from synthesis method B and cryptomelane over a range of temperature.
Figure 23:
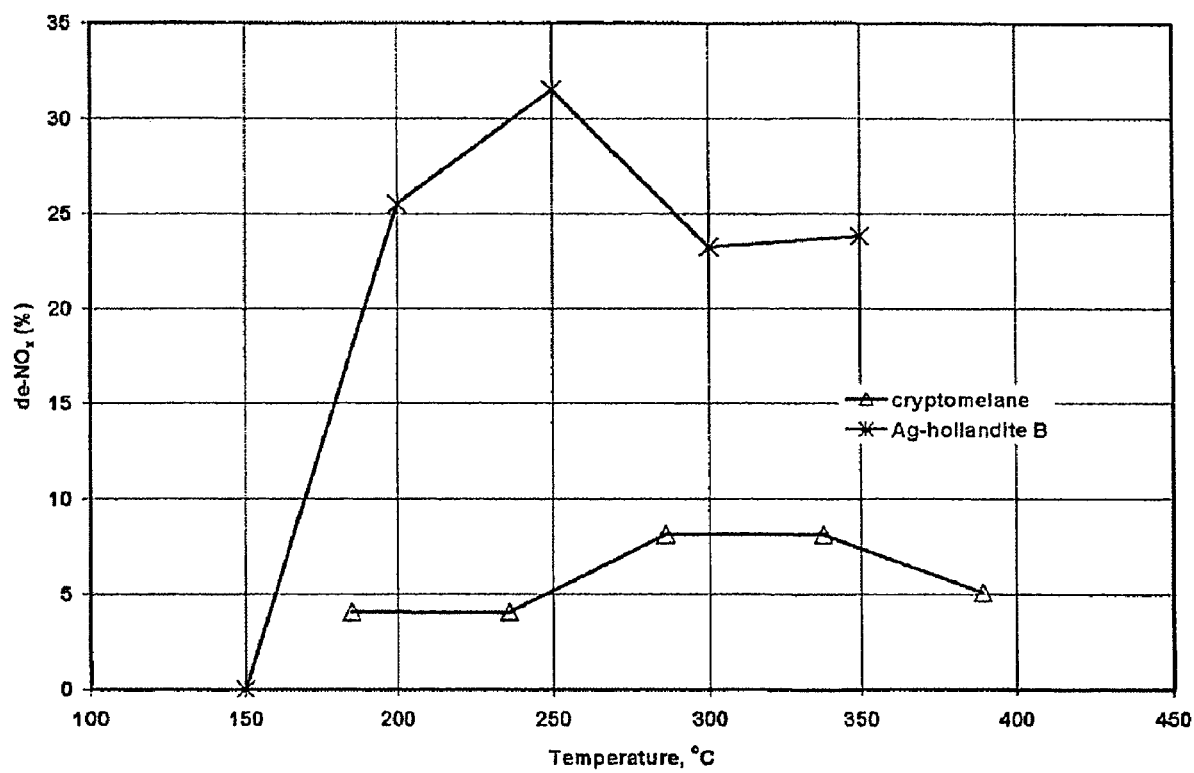
FIG. 23 is a graph showing exemplary plots of the de-$NO_x$ properties of Ag-hollandite from synthesis method B and cryptomelane over a range of temperatures.

Ag-hollandite also can be useful in the oxidation of NO. FIG. 22 shows the oxidation performance of Ag-hollandite and cryptomelane with respect to NO, i.e. oxidizing NO to $NO_2$ at different temperatures. At 200° C., Ag-hollandite can oxidize 38% of the NO present to $NO_2$, however, at higher temperatures (e.g., above 300° C.), its NO oxidation ability seems to be less than that of cryptomelane. At temperatures above about 300° C., the NO oxidation of Ag-hollandite B is generally about 20% lower than that of cryptomelane. While this result seems inconsistent with the observation that Ag-hollandite is more reactive with reductants than cryptomelane, the inconsistency can be explained, for example, by a difference in de-$NO_x$ performance (i.e., conversion of $NO_x$ to $N_2$) of Ag-hollandite and cryptomelane. The de-$NO_x$ performance was measured for Ag-hollandite and cryptomelane, and the results are given in FIG. 23. As can be seen, Ag-hollandite shows substantially greater ability to decrease the total $NO_x$ in the feed in the 200° C. to 350° C. range. Therefore, the difference in NO oxidation ability between cryptomelane and Ag-hollandite (noted with respect to FIG. 22) likely comes from this difference in their de-$NO_x$ abilities, for example, some $NO_2$ is decomposed to $N_2$ and $O_2$ by Ag-hollandite.

Ag-hollandite also can be useful as a catalyst for CO, NO, and $C_3H_6$ oxidation reactions, since no structure change was observed after these reactions based on XRD analysis. Also, as shown in Table 11, Ag-hollandite A has 36 wt % $SO_2$ capacity at 325° C. using stimulant exhaust gas with CO, $C_3H_6$, and NO as feed gas. If CO, NO, or $C_3H_6$ has the ability to permanently reduce Ag-hollandite, the $SO_2$ capacity would have shown a larger decrease. Therefore, after reaction with these reductants, the reduced Ag-hollandite must be readily oxidized back to its original structure by the oxygen in the feed gas.

Summary of Example 14

Ag-hollandite was successfully synthesized by the ion exchange of cryptomelane in an $AgNO_3$ melt. Compared to the high temperature solid state syntheses process described in references 11 and 12 below, this process is very simple and the resulting Ag-Hollandite has a smaller crystal size and a higher surface area. Ag-hollandite synthesized according to certain embodiments disclosed above, was found to be even more useful as a low-temperature $SO_2$ sorbent than cryptomelane. Ag-hollandite can also be used as active catalyst for oxidation of CO, NO, hydrocarbons and sulfur-containing compounds. Silver-hollandite is able to maintain this catalytic oxidation behavior even when the material is simultaneously aging by sorption of $SO_2$, whereas many other oxidation catalysts rapidly lose oxidation activity toward these gases as $SO_2$ sorption progresses. Moreover, with CO—NO mixtures, silver-hollandite shows evidence of lean $NO_x$ conversion, i.e., partial conversion of $NO_x$ to $N_2$ gas, which can be advantageous in emissions control.

Additional details of these studies can be found in the above referenced U.S. Provisional Application No. 60/649,656, filed Feb. 3, 2005.

Example 15

Desulfurization

Silver hollandite and cryptomelane were found to be effective for desulfurization of hydrocarbon gases and liquids. By way of theory, this desulfurization may involve sorption and/or catalysis.

Figure 24A:
FIGS. 24A-B are gas chromatograph traces of sulfur species present in a liquid hydrocarbon before (FIG. 24A) and after (FIG. 24B) a sorption process using a Cu(I)Y zeolite.
Figure 24B:
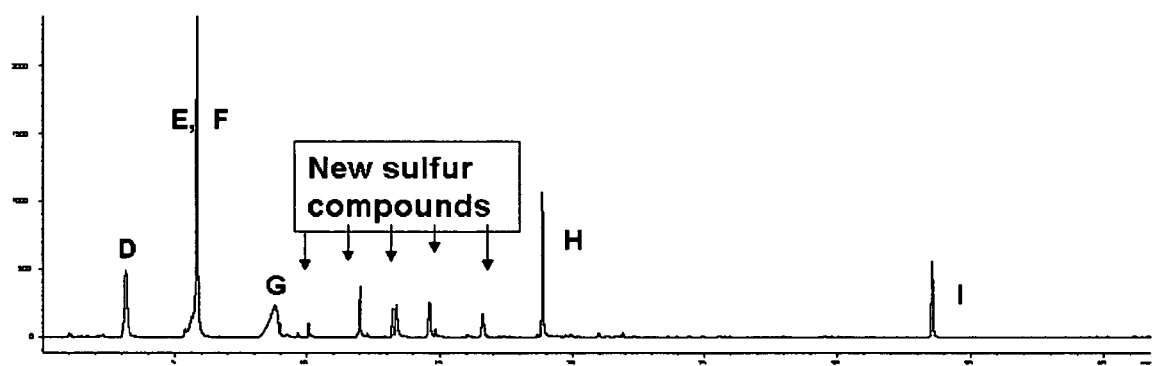

When liquid hydrocarbons are treated with Cu(I) or Cu(II) zeolites, a variety of new sulfur-containing compounds are formed. FIGS. 24A and B illustrate this by showing sulfur-specific gas chromatographic traces of a liquid hydrocarbon before (FIG. 2A) and after (FIG. 2B) a sorption process using a Cu(I)Y zeolite. The liquid hydrocarbon was ARCO gasoline with a 92 octane rating (ARCO92). The ARCO92 was spiked with 3 ppmw each of ethanethiol (peak A), 2-propanethiol (peak B), 2-methyl-2-propanethiol (peak C), thiophene (peak D), 2-methyl thiophene (peak E), 3-methyl thiophene (peak F), 2,5-dimethyl thiophene (peak G), benzothiophene (peak H), and dibenzothiophene (peak I). The sorption process included mixing 15 mL of the spiked ARCO92 with 0.15 g of Cu(I)Y zeolite at room temperature and allowing the mixture to sit overnight. In FIG. 2B, the unlabeled peaks represent new sulfur compounds formed during the sorption process. New sulfur compounds also were found after a similar sorption process using Cu(II)Y zeolite.

Both the Cu(I) and Cu(II) zeolites removed about 100% of the thiols and none of the thiophenic compounds. When tested on the same spiked liquid hydrocarbon, silver hollandite also removed about 100% of the thiols and none of the thiophenic compounds. However, unlike the Cu(I) and Cu(II) zeolites, the silver hollandite did not generate new sulfur compounds. Furthermore, when silver hollandite was added to the liquid hydrocarbons previously treated with Cu(I) and Cu(II) zeolites, the new sulfur compounds were removed.

In another set of trials, silver hollandite was compared to Cu(I)Y and Cu(II)Y for polishing hydrodesulfurized light-cut JP8 jet fuel. The results are shown in Table 12.

TABLE 12

JP8 light-cut HDS product polishing tests

| Sorbent | Treatment | Sulfur Removal % |
|---|---|---|
| Cu(I)Y | 100 mg Cu(I)Y added to 10 mL 16 ppm HDS product mixed at room temp. for 16 hr | 27 |
| Cu(II)Y | 100 mg Cu(II)Y (preheated at 120° C. for 8 hr) added to 10 mL 16 ppm HDS product mixed at room temp. for 16 hr | 31 |
| Cu(II)Y | 500 mg Cu(II)Y (preheated at 120° C. for 8 hr) added to 10 mL 16 ppm HDS product mixed at room temp. for 16 hr | 47 |
| Ag-hollandite | 100 mg Ag-hollandite added to 10 mL 16 ppm HDS product mixed at room temp. for 16 hr | 53 |
| Ag-hollandite | 500 mg Ag-hollandite added to 10 mL 16 ppm HDS product mixed at room temp. for 16 hr | 77 |

Figure 25A:
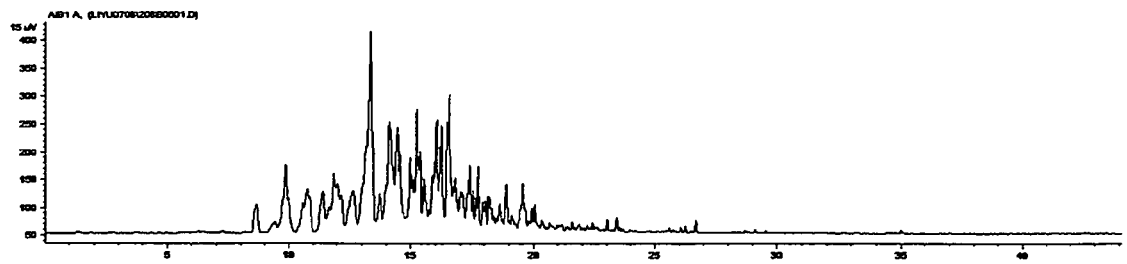
FIGS. 25A-C are gas chromatograph traces of sulfur species present in a liquid hydrocarbon showing how treatment with certain embodiments of cryptomelane affects the concentration of sulfur compounds in this liquid hydrocarbon.
Figure 25B:
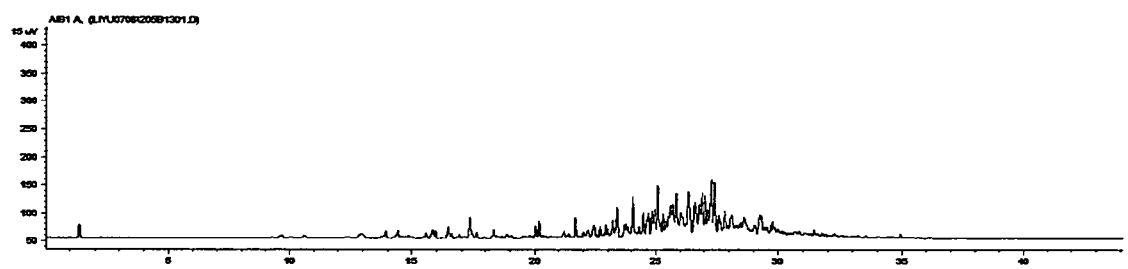
Figure 25C:
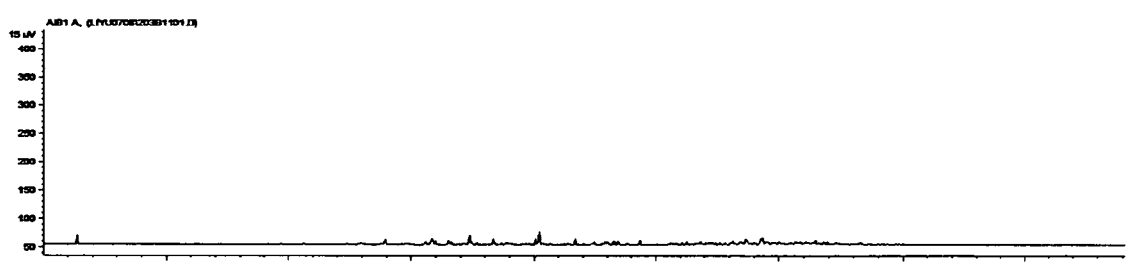

FIGS. 25A-C are sulfur-specific gas chromatographic traces showing how treatment with cryptomelane affects the concentration of sulfur compounds in hydrodesulfurized light-cut JP8 jet fuel. FIG. 25A is a sulfur-specific gas chromatographic trace of hydrodesulfurized light-cut JP8 jet fuel having 325 ppm sulfur. FIG. 25B is a sulfur-specific gas chromatographic trace of the jet fuel after oxidative desulfurization with cryptomelane (100 mg cryptomelane added to a mixture of 10 mL 1M $HNO_3$ and 10 mL jet fuel mixed at 68° C. for 16 hr) showing 130 ppm sulfur remaining. Finally, FIG.

25C is a sulfur-specific gas chromatographic trace of the jet fuel after the organic phase was separated and treated with 15 ml DI water three times. The final sulfur content was 26 ppm. Rinsing with DI water may have removed somewhat polar oxidation products, such as sulfones.

Figure 26:
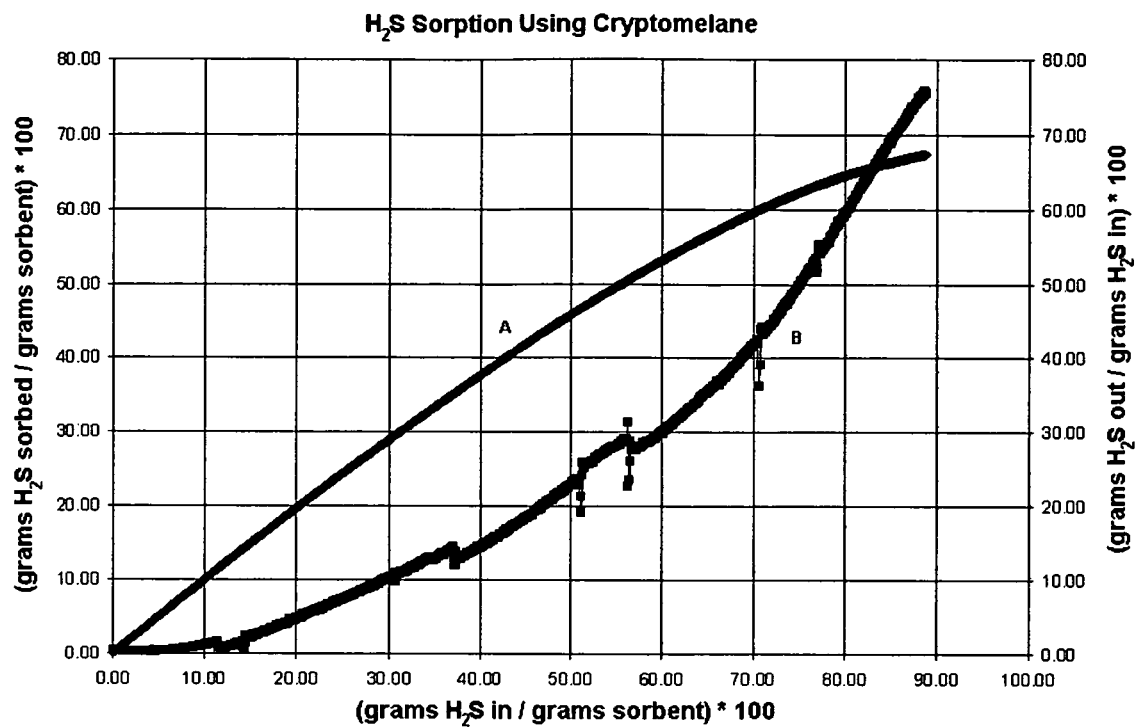
FIG. 26 is a plot illustrating the use of certain embodiments of cryptomelane to sorb $H_2S$ from nitrogen gas.
Figure 27:
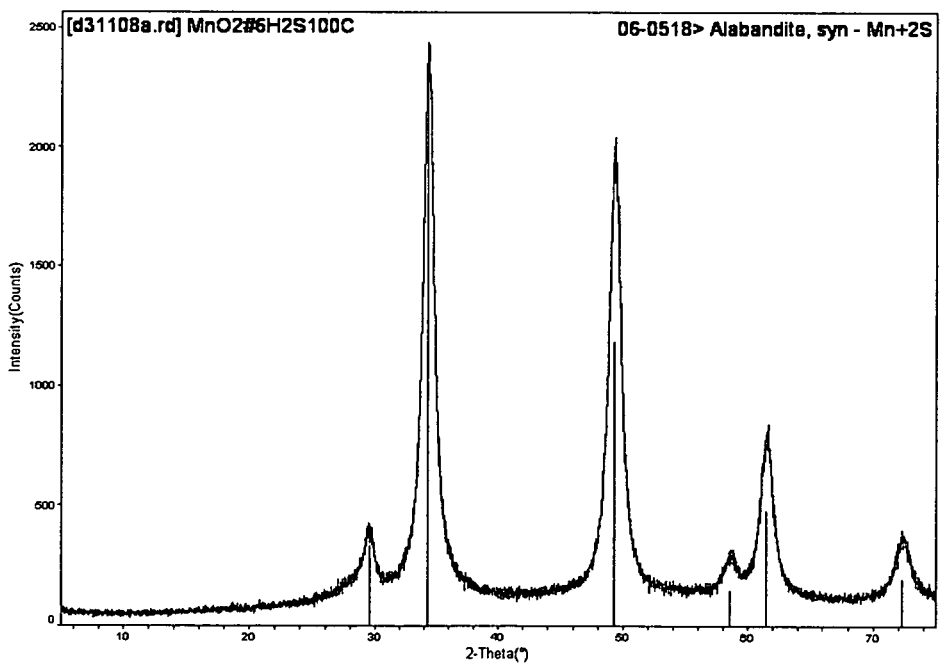
FIG. 27 is a XRD plot showing that MnS is produced by desulfurization of natural gas using an embodiment of the disclosed process using cryptomelane.

FIG. 26 is a plot illustrating the use of cryptomelane to sorb $H_2S$ from nitrogen gas. The test was performed at 100° C. using nitrogen gas with 70 ppm $H_2S$ and a GHSV of 75,000 $hr^{-1}$. FIG. 27 is a XRD plot showing the presence of MnS in the product generated by a cryptomelane sorption process performed on natural gas. Elemental sulfur also was observed. The elemental sulfur may have resulted from incomplete oxidation of sulfur-containing compounds in the natural gas.

In another embodiment of the disclosed method, methane was spiked with 10 ppm each of dimethyl sulfide, isopropyl mercaptan, tertiary-butyl mercaptan and tetrahydrothiophene and exposed to silver hollandite or Cu(II)Y zeolite at 25° C. and a GHSV of 10,000 $hr^{-1}$. The sulfur capacity using silver hollandite was found to be 0.8 (grams sulfur)/(grams sorbent).

CLOSURE

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a," "an," "at least one," and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary.

Likewise, where the term "input" or "output" is used in connection with a fluid processing unit, it should be understood to comprehend singular or plural and one or more fluid channels as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein, including the following scientific publications referenced in the specification above:

(1) X. Chen, Y. F. Shen, S. L. Suib, and C. L. O'Young, "Characterization of Manganese Oxide Octahedral Molecular Sieve (M-OMS-2) Materials with Different Metal Cation Dopants," *Chem. Mater.* 2002, 14, 940-948.

(2) G. G. Xia, Y. G. Yin, W. S. Willis, J. Y. Wang, and S. L. Suib, "Efficient Stable Catalysts for Low Temperature Carbon Monoxide Oxidation", *J. Catal.* 1999, 185, 91-105.

(3) R. N. DeGuzman, Y. F. Shen, E. J. Neth, S. L. Suib, C. K. O'Young, S. Levine, and J. M. Newsam, "Synthesis and Characterization of Octahedral Molecular Sieves (OMS-2) Having the Hollandite Structure," *Chem. Mater.* 1994, 6 815-821.

(4) S. L. Suib, C-L O'Young, "Synthesis of Porous Materials," M. L. Occelli, H. Kessler, eds, M. Dekker, Inc., p. 215, 1997.

(5) D. C. Golden, C. C. Chen, and J. B. Dixon, "Synthesis of Todorokite," *Science.* 1986, 231, 717-719.

(6) D. C. Golden, C. C. Chen, and J. B. Dixon, "Transformation of birnessite to buserite, todorokite, and manganite under mild hydrothermal treatment," *Clays Clay Miner.* 1987, 35, 271-280.

(7) J. P. Parant, R. Olazcuaga, M. Devalette, C. Fouassier, and P. Hagenmuller, "Sur Quelques Nouvelles Phases de Formule NaxMnO2(x<1)," *J. Solid State Chem.* 1971, 3, 1-11.

(8) Y. F. Shen, R. P. Zerger, R. N. DeGuzman, S. L. Suib, L. McCurdy, D. I. Potter, and C. L. O'Young, "Manganese oxide octahedral molecular sieves: preparation, characterization, and applications," *Science.* 1993, 260, 511-515.

(9) G. G. Xia, W. Tong, E. N. Tolentino, N. G. Duan, S. L. Brock, J. Y. Wang, S. L. Suib, and T. Ressler, "Synthesis and characterization of nanofibrous sodium manganese oxide with a 2×4 tunnel structure," *Chem. Mater.* 2001, 13, 1585-1592.

(10) R. Burch, "Knowledge and Know-How in Emission Control for Mobile Applications," *Catalysis Reviews*, Vol. 46, No. 3-4, pp. 271-333, 2004.

(11) F. M. Chang and M. Jansen, "$Ag_{1.8}Mn_8O_{16}$: Square Planar Coordinated $At^+$ Ions in the Channels of a Novel Hollandite Variant," *Agnew. Chem. Int. Ed. Engt.* 23, No. 11, pp. 906-907, 1984.

(12) F. M. Chang and M. Jansen, "Der Erste Silberhollandit," *Revuede Clzimie Minerale*, Vol 23(1), pp. 48-54, 1986.

We claim:

1. A method for treating a liquid comprising a liquid hydrocarbon, comprising exposing the liquid to silver hollandite at a temperature from about 50° C. to about 350° C. such that the silver hollandite catalyzes oxidation of from about 10% to about 100% of at least one compound in the liquid hydrocarbon.

2. A method for treating a gas comprising NO, comprising exposing the gas to silver hollandite at a temperature from about 50° C. to about 350° C. such that the silver hollandite catalyzes oxidation of from about 10% to about 100% of the NO.

3. The method according to claim 2, wherein the gas or liquid is a gas and the gas comprises a combustion exhaust stream.

4. A method for treating a gas or liquid, wherein the gas or liquid comprises a hydrocarbon, comprising exposing the gas or liquid to silver hollandite at a temperature from about 50° C. to about 350° C. such that the silver hollandite catalyzes oxidation of from about 10% to about 100% of the hydrocarbon.

5. The method according to claim 4, wherein the gas or liquid is a gas and the gas comprises a combustion exhaust stream.

6. A method for treating a gas or liquid, comprising exposing the gas or liquid to silver hollandite such that the silver hollandite catalyzes oxidation of a substantial portion of at least one sulfur-containing compound in the gas or liquid to produce a sulfur-containing product, and the silver hollandite sorbs a substantial portion of the sulfur-containing product.

7. The method according to claim 6, wherein the gas or liquid comprises a sulfur-containing compound having at least one thiol group.

8. The method according to claim 6, wherein the silver hollandite catalyzes oxidation of from about 10% to about 100% of the sulfur-containing compound.

9. The method according to claim 8, wherein the sulfur-containing compound is a sulfur-containing compound having at least one thiol group, a sulfur-containing compound having at least one sulfide bond, a sulfur-containing compound having at least one disulfide bond, $H_2S$, or a combination thereof.

10. The method according to claim 6, wherein the silver hollandite sorbs from about 10% to about 100% of the sulfur-containing product.

11. The method according to claim 10, wherein the sulfur-containing product is $SO_2$.

12. The method according to claim 6, wherein the sulfur-containing product is $SO_2$.

13. A method for removing a substantial portion of at least one sulfur-containing compound from a gas or liquid comprising exposing the gas or liquid to silver hollandite.

14. The method according to claim 13, wherein the gas or liquid is a gas and the gas comprises natural gas.

15. The method according to claim 14, wherein the natural gas is exposed to the silver hollandite at a temperature from about ambient temperature to about 250° C.

16. A method for removing a substantial portion of at least one sulfur-containing compound from a liquid hydrocarbon, comprising exposing the liquid hydrocarbon to silver hollandite.

17. The method according to claim 16, wherein the liquid hydrocarbon is exposed to the silver hollandite at a temperature from about ambient temperature to about 100° C.

18. The method according to claim 16, further comprising rinsing the liquid hydrocarbon with a polar liquid after exposing the liquid hydrocarbon to silver hollandite, wherein the polar liquid removes the sulfur-containing compound from the liquid hydrocarbon.

19. A method for removing a substantial portion of $NO_2$ in a gas, comprising exposing the gas to silver hollandite such that the silver hollandite catalyzes reduction of a substantial portion of the $NO_2$ to form $N_2$ and $O_2$.

20. The method according to claim 19, wherein the gas is exposed to the silver hollandite at a temperature from about 150° C. to about 350° C.

21. A catalytic device comprising silver hollandite, wherein the catalytic device is configured to expose a gas or liquid to the silver hollandite such that the silver hollandite catalyzes oxidation of a substantial portion of at least one sulfur-containing compound in the gas or liquid and sorbs a sulfur-containing compound in the gas or liquid.

22. The device according to claim 21, wherein the gas or liquid comprises natural gas.

23. The device according to claim 21, wherein the sulfur-containing compound sorbed by the silver hollandite is a sulfur-containing product produced by oxidation of the at least one sulfur-containing compound in the gas or liquid.

24. A sulfur-removal device comprising silver hollandite, wherein the sulfur-removal device is configured to expose a gas or liquid to the silver hollandite so as to remove a substantial portion of at least one sulfur-containing compound from the gas or liquid.

25. A catalytic device comprising silver hollandite, wherein the catalytic device is configured to expose a gas or liquid to the silver hollandite such that the silver hollandite reduces a substantial portion of $NO_2$ in the gas or liquid to form $N_2$ and $O_2$.

26. A method for treating a gas or liquid, comprising exposing the gas or liquid to silver hollandite such that the silver hollandite catalyzes oxidation of from about 10% to about 100% of at least one compound in the gas or liquid.

* * * * *

UNITED STATES PATENT AND TRADEMARK OFFICE
CERTIFICATE OF CORRECTION

PATENT NO. : 7,700,517 B2
APPLICATION NO. : 11/347459
DATED : April 20, 2010
INVENTOR(S) : Liyu Li and David L. King It is certified that error appears in the above-identified patent and that said Letters Patent is hereby corrected as shown below:

In the Specification:

Column 2, line 67/Column 3, line 1 "chan nels" should read --chan-nels--.

Column 19, line 13 "475 CC," should read --475° C.,--.

Signed and Sealed this

Twenty-eighth Day of September, 2010

David J. Kappos
*Director of the United States Patent and Trademark Office*